(12) United States Patent
Corten et al.

(10) Patent No.: US 10,160,872 B2
(45) Date of Patent: *Dec. 25, 2018

(54) AQUEOUS DISPERSION OF A POLYESTER AND A POLYAMIDE OF LOW ACID NUMBER AND COATING COMPOSITION COMPRISING SAME FOR APPLYING A BASECOAT

(71) Applicant: BASF Coatings GmbH, Muenster (DE)

(72) Inventors: Cathrin Corten, Shanghai (CN); Dirk Eierhoff, Muenster (DE); Patrick Wilm, Ahlen (DE); Joerg Schwarz, Muenster (DE); Stefanie Boshe-Plois, Ochtrup (DE); Susanne Katharina Fechtner, Muenster (DE); Ralf Nickolaus, Drensteinfurt (DE)

(73) Assignee: BASF Coatings GmbH, Münster (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/505,477

(22) PCT Filed: Aug. 21, 2015

(86) PCT No.: PCT/EP2015/069262
§ 371 (c)(1),
(2) Date: Feb. 21, 2017

(87) PCT Pub. No.: WO2016/026966
PCT Pub. Date: Feb. 25, 2016

(65) Prior Publication Data
US 2017/0267876 A1 Sep. 21, 2017

(30) Foreign Application Priority Data
Aug. 22, 2014 (EP) .................................... 14182025

(51) Int. Cl.
| | | |
|---|---|---|
| C09D 167/08 | (2006.01) | |
| C09D 177/00 | (2006.01) | |
| C09D 7/44 | (2018.01) | |
| C09D 5/02 | (2006.01) | |
| C09D 177/08 | (2006.01) | |
| C09D 7/65 | (2018.01) | |
| C09D 7/20 | (2018.01) | |
| C08L 67/00 | (2006.01) | |
| C09D 133/10 | (2006.01) | |
| C09D 167/00 | (2006.01) | |
| C09D 175/04 | (2006.01) | |
| C08L 77/00 | (2006.01) | |

(52) U.S. Cl.
CPC .............. *C09D 7/44* (2018.01); *C08L 67/00* (2013.01); *C09D 5/027* (2013.01); *C09D 7/20* (2018.01); *C09D 7/65* (2018.01); *C09D 133/10* (2013.01); *C09D 167/00* (2013.01); *C09D 175/04* (2013.01); *C09D 177/00* (2013.01); *C09D 177/08* (2013.01); *C08L 77/00* (2013.01); *C08L 2201/00* (2013.01); *C08L 2201/54* (2013.01); *C09D 167/08* (2013.01)

(58) Field of Classification Search
None
See application file for complete search history.

(56) References Cited

U.S. PATENT DOCUMENTS

| | | | |
|---|---|---|---|
| 2,793,219 A | 5/1957 | Barrett et al. | |
| 2,955,121 A | 10/1960 | Myers et al. | |
| 5,025,043 A | 6/1991 | Smith | |
| 2011/0042623 A1* | 2/2011 | Luer | C08G 69/34 252/500 |
| 2017/0267875 A1* | 9/2017 | Corten | C09D 7/004 |

FOREIGN PATENT DOCUMENTS

| | | | |
|---|---|---|---|
| DE | 25 06 211 A1 | 8/1975 | |
| DE | 40 09 858 A1 | 10/1991 | |
| DE | 40 28 386 A1 | 3/1992 | |
| DE | 4028386 A1 * | 3/1992 | .............. C09D 7/02 |
| DE | 44 37 535 A1 | 5/1996 | |
| DE | 44 38 504 A1 | 5/1996 | |
| DE | 199 48 004 A1 | 7/2001 | |
| EP | 0 228 003 A1 | 7/1987 | |
| EP | 0 593 454 | 10/1991 | |
| EP | 0 787 159 | 5/1996 | |
| EP | 0 877 063 A2 | 11/1998 | |
| EP | 1 153 989 A1 | 11/2001 | |
| EP | 2 457 961 A1 | 5/2012 | |
| WO | 92/15405 A1 | 9/1992 | |
| WO | 2005/021168 A1 | 3/2005 | |
| WO | 2009/100938 A1 | 8/2009 | |

OTHER PUBLICATIONS

International Search Report dated Nov. 5, 2015 in PCT/EP2015/069262 filed Aug. 21, 2015.

* cited by examiner

*Primary Examiner* — Richard A Huhn
(74) *Attorney, Agent, or Firm* — Oblon, McClelland, Maier & Neustadt, L.L.P.

(57) ABSTRACT

The present invention relates to an aqueous dispersion (P) comprising at least one polymeric resin (P1) and at least one polymeric resin (P2) different therefrom, where the polymeric resin (P1) is a polyamide and the polymeric resin (P2) is a polyester which is at least obtainable by reaction of at least one polymerized aliphatic $C_{12}$-$C_{24}$ monocarboxylic acid with at least one diol and/or polyol, (P) being obtainable by dispersing of (P1) in water or an aqueous medium in the presence of (P2), and where (P1) has an acid number <10 mg of KOH per g of polyamide, and (P) contains at most 25 wt %, based on the total weight of (P), of one or more organic solvents, and also to an aqueous coating composition comprising (P), at least one binder (A) comprising at least one polymeric resin (A1), which is different from the polymeric resins (P1) and (P2), and at least one pigment (B) for at least partly coating a substrate with a basecoat film.

17 Claims, No Drawings

AQUEOUS DISPERSION OF A POLYESTER AND A POLYAMIDE OF LOW ACID NUMBER AND COATING COMPOSITION COMPRISING SAME FOR APPLYING A BASECOAT

CROSS REFERENCE TO RELATED APPLICATION

This application is a National Stage entry under 35 USC 371 of PCT/EP2015/069262, filed on Aug. 21, 2015, and claims priority to European Patent Application No. 14182025.8, filed on Aug. 22, 2014.

The present invention relates to an aqueous dispersion (P) comprising at least one polymeric resin (P1) and at least one polymeric resin (P2) different therefrom, where the polymeric resin (P1) is a polyamide and the polymeric resin (P2) is a polyester which is at least obtainable by reaction of at least one polymerized aliphatic $C_{12}$-$C_{24}$ monocarboxylic acid with at least one diol and/or polyol, (P) being obtainable by dispersing of (P1) in water or an aqueous medium in the presence of (P2), and where (P1) has an acid number <10 mg of KOH per g of polyamide, and (P) contains at most 25 wt %, based on the total weight of (P), of one or more organic solvents, and also to an aqueous coating composition comprising (P), at least one binder (A) comprising at least one polymeric resin (A1), which is different from the polymeric resins (P1) and (P2), and at least one pigment (B) for at least partly coating a substrate with a basecoat film.

Particularly in automotive finishing, but also in other areas where the desire is for coatings with good decorative effect and effective protection from corrosion at the same time, it is known practice to endow substrates with a plurality of coating films disposed one above another. Multicoat paint systems are applied here preferably by the "basecoat/clearcoat" process—that is, a pigmented basecoat material is applied first of all, and after a short flashing time, without a baking step (wet-on-wet process), a clearcoat material is applied over it. Basecoat and clearcoat are subsequently baked together. The "basecoat/clearcoat" process has become particularly important in the application of automotive metallic effect paints.

For reasons of economics and environment, there is a requirement to use aqueous coating compositions when applying such multicoat paint systems, especially when applying the basecoat film.

The coating compositions for producing these basecoat films ought to be processible by the aforementioned "wet-on-wet" process—that is, after an extremely short primary drying time without a baking step, it ought to be possible to apply a clearcoat film over them without, in so doing, causing defects to the appearance, such as pinholes, pops, bits and/or leveling defects. In order at least to minimize such defects, suitable rheological assistants, among other agents, are commonly used in the coating compositions that are to be applied.

In the case of metallic effect paints of the basecoat/clearcoat type, moreover, there are further requirements to be met as well. The metallic effect is dependent critically on the orientation of the metal pigment particles within the coating film. A metallic effect basecoat material to be processed in the "wet-on-wet" process, accordingly, must yield coating films in which, following application, the metal pigments are present in a favorable spatial orientation, and in which this orientation becomes rapidly fixed in such a way that it cannot be disrupted in the course of the further finishing operation. Suitable parameters for characterizing the metallic effect are the lightness of the shade, the flop index, and the assessment of cloudiness in the resulting finish.

Known from EP 0 877 063 A2 are aqueous coating compositions which comprise a polyamide commonly used in aqueous compositions and distinguish, on the basis of its intended use in aqueous systems, by a comparatively high acid number of typically ≥30. Aqueous coating compositions which include such polyamides of comparatively high acid number, as typically used in aqueous compositions, are also known, furthermore, from WO 2009/100938 A1 and EP 2 457 961 A1. A disadvantage of the presence of such a polyamide as a rheological assistant in aqueous coating compositions, however, is particularly the incidence of bits during processing by the "wet-on-wet" process and/or during incorporation of the polyamide into the coating compositions, and/or inadequate storage stability (separation, or phase separation) of such coating compositions, particularly at relatively high temperatures such as temperatures 40° C., for example.

DE 40 28 386 A1 as well discloses aqueous coating compositions which include a polyamide as sole rheological assistant.

EP 1 153 989 A1 discloses aqueous coating compositions which comprise a polyamide of this kind, used typically in aqueous coating compositions and having an acid number ≥30, such as the commercially available product Disparlon® AQ-600, for example, and which further comprise, as an additional rheological assistant, a metal silicate, such as the commercially available metal silicate Laponite® RD, for example. A disadvantage of the presence of such a metal silicate, especially in combination with a polyamide commonly used in aqueous compositions and having an acid number >30, in aqueous coating compositions, however, may often be the incidence of pinholes and/or pops during processing by the "wet-on-wet" process. The use of such metal silicates as the sole rheological assistant, however, has disadvantages in relation, among other things, to the incidence of runs and pops.

The use of polyamides with relatively low acid numbers per se as rheological assistants is known in principle, although such polyamides can be used exclusively in solvent-based coating compositions. The use of such solvent-based coating compositions with high proportions of organic solvents, however, is undesirable on environmental grounds. Direct incorporation of such polyamides with low acid number as rheological assistants into aqueous coating compositions is not possible, being accompanied by bittiness and/or by a lack of adequate storage stability on the part of corresponding coating compositions.

There is therefore a need for aqueous coating compositions, especially basecoat compositions, which do not have the disadvantages identified above, but which nevertheless allow the use of polyamides having only low acid numbers as rheological assistants.

It is an object of the present invention, therefore, to provide an aqueous coating composition, more particularly an aqueous basecoat composition, which has no disadvantages, and in particular has advantages, relative to the coating compositions known from the prior art, and which permits the use of polyamides with only low acid numbers as rheological assistants in aqueous coating compositions. A particular object of the present invention is to provide an aqueous coating composition, more particularly an aqueous basecoat composition, of this kind that is notable for advantageous applications properties, but with which at the same time there should be no adverse effect on the achievable metallic effect of the coating composition.

This object is solved by the subject matter claimed in the claims and also by the preferred embodiments of this subject matter that are described in the description hereinafter.

A first subject of the present invention is therefore an aqueous dispersion (P) comprising at least one polymeric resin (P1) and at least one polymeric resin (P2) different therefrom, where the polymeric resin (P1) is a polyamide and
the polymeric resin (P2) is a polyester, the aqueous dispersion (P) being obtainable by dispersing of the polymeric resin (P1) in water or an aqueous medium in the presence of the polymeric resin (P2), wherein the polyamide used as polymeric resin (P1) has an acid number <10 mg of KOH per g of polyamide, and
the polyester used as polymeric resin (P2) is at least obtainable by reaction of at least one polymerized aliphatic $C_{12}$-$C_{24}$ monocarboxylic acid with at least one diol and/or polyol, and
the aqueous dispersion (P) contains at most 25 wt %, based on the total weight of the dispersion (P), of one or more organic solvents.

It has surprisingly been found that an aqueous dispersion (P) of this kind is a suitable component in an aqueous coating composition which can be used in particular for at least partly coating an optionally coated substrate with a basecoat film. It has surprisingly been found that a resultant aqueous coating composition of the invention of this kind is suitable particularly in a "basecoat/clearcoat" process for applying a basecoat film to an optionally coated substrate, and can therefore be used as a basecoat coating composition.

It has surprisingly been found, moreover, that the presence of the polymeric resin (P2) in the dispersion (P) makes it possible to incorporate into aqueous coating compositions, as polymeric resin (P1), a polyamide which has an acid number <10 mg KOH per g of polyamide, and which, accordingly, can normally be used only in solvent-based coating compositions. In particular it has surprisingly been found that the dispersion (P) of the polymeric resins (P1) and (P2) according to the invention, or the polyamide (P1) transferred into an aqueous composition by means of (P2), is a suitable rheological assistant in aqueous coating compositions. In particular it has surprisingly been found, moreover, that in this respect it is essential to the invention that the polyester used in accordance with the invention as polymeric resin (P2) is at least obtainable by reaction of at least one polymerized aliphatic $C_{12}$-$C_{24}$ monocarboxylic acid with at least one diol and/or polyol.

Furthermore, it has surprisingly been found that a maximum fraction of at most 25 wt % of one or more organic solvents within the dispersion (P), based on the total weight of dispersion (P), is essential to the invention, since corresponding aqueous comparative dispersions which have a higher fraction of organic solvents, though also allow the (brief) transfer of polyamides having an acid number <10 mg of KOH per g of polyamide into an aqueous phase, exhibit only inadequate storage stability, since after a short time there is separation, or phase separation.

It has surprisingly been found, furthermore, that by virtue in particular of the presence of the polymeric resins (P1) and (P2) in the dispersion (P) of the invention, or of the presence of the polymeric resin (P1) transferred into the aqueous dispersion (P) of the invention by means of (P2), it is possible to ameliorate or prevent the incidence of bits, pinholes, and pops when an aqueous coating composition comprising the dispersion (P) is used for at least partly coating an optionally coated substrate with a basecoat film. It has surprisingly been found here, moreover, that the metallic effect of the respective coating composition is not adversely affected and that the coating compositions of the invention are notable in particular for good properties in relation to the assessment of cloudiness in the finish. It has further been found surprisingly that the coating compositions of the invention are notable for good storage stability even at relatively high temperatures, such as, for example, ≥40° C. for a duration of 2 weeks. With regard to at least one of these aforementioned properties, customary coating compositions known from the prior art, in which polyamides are used that have an acid number ≥10 or metal silicates, such as the commercially available product Laponite®, for example, are used as rheological assistants, exhibit disadvantages. Direct, separate incorporation of the polymeric resin (P1) (without prior preparation of a dispersion (P), from (P1) and the polymeric resin (P2)) into aqueous coating compositions is not possible, being accompanied by bittiness and/or by a lack of adequate storage stability on the part of corresponding coating compositions.

The terms "pops", "runs", "pinholes", "flop", and "bits" are known to the skilled person and define for example in Römpp Lexikon, Lacke und Druckfarben, Georg Thieme Verlag 1998.

Aqueous Dispersion (P)

The fractions in weight % of the water, (P1) and (P2) components present in the aqueous dispersion (P) of the invention, and also of any below-described components (C) that may be present, and also of any organic solvents present, add up preferably to 100 wt %, based on the total weight of the aqueous dispersion (P).

The term "comprising" in the sense of the present invention, in connection with the aqueous dispersion (P) of the invention, has in one preferred embodiment the definition "consisting of". In this preferred embodiment of the aqueous dispersion (P) of the invention, one or more of the further components optionally present in the aqueous dispersion (P) may be present therein, these components being as defined below, for example—besides the water, (P1) and (P2) components—optionally (C) and/or organic solvent(s). All components here may each be present in their preferred embodiments, as specified above and below, in the aqueous dispersion (P) of the invention.

The aqueous dispersion (P) of the invention contains at most 25 wt %, based on the total weight of the dispersion (P) of one or more organic solvents. The skilled person is familiar with the term "organic solvent". This term is defined for example in Council Directive 1999/13/EC of Mar. 11, 1999 (Article 2, section 18) (referred to therein as "solvent"). Examples of organic solvents are (hetero)cyclic, (hetero)aliphatic or (hetero)aromatic hydrocarbons, mono- or polyfunctional alcohols, ethers, esters, ketones, and amides, such as, for example, N-methylpyrrolidone, N-ethylpyrrolidone, dimethylformamide, toluene, xylene, butanol, ethyl glycol and butyl glycol and their acetates, butyl diglycol, diethylene glycol dimethyl ether, cyclohexanone, methyl ethyl ketone, methyl isobutyl ketone, acetone, isophorone, or mixtures thereof.

The aqueous dispersion (P) of the invention contains preferably at most 24.5 wt %, more preferably at most 24 wt %, very preferably at most 23.5 wt %, more particularly at most 23 wt %, most preferably at most 20 wt %, based in each case on the total weight of the dispersion (P), of one or more organic solvents.

The aqueous dispersion (P) of the invention comprises water as liquid diluent. The term "aqueous" in connection with the aqueous dispersion (P) of the invention refers preferably to liquid aqueous dispersions (P) which as liquid diluent, i.e., as liquid solvent and/or dispersion medium, comprise water as a principal component. The aqueous dispersions (P) of the invention may optionally, however, include organic solvents in small fractions up to at most 25 wt %, based on the total weight of the aqueous dispersion (P).

The aqueous dispersion (P) of the invention is preferably obtainable by dispersing of the polymeric resin (P1) in water or aqueous medium in the presence of the polymeric resin (P2) and also, optionally, of a further component (C) and/or organic solvent(s) in a step (1) to give the aqueous dispersion (P).

The dispersing of step (1) takes place preferably at a temperature in the range from 15 to 30° C. over a time of 10 to 60 minutes, preferably over a time of 10 to 30 minutes. The dispersing may take place by means of commercial devices, more particularly dissolvers, such as with the Dispermat® LC30 device from VWA-Getzmann, Germany. Such devices typically have a stirring disk (toothed disk) located in a stirring vessel. The relative size ratio of the diameter of the stirring disk to the diameter of the stirring vessel is preferably in a range from 1:1.1 to 1:2.5. The peripheral speed of the stirring disk when implementing step (1) is preferably in a range from 15 to 25 m/s, more preferably from 15 to 20 m/s. The fill level of the stirring vessel is preferably in a range from 60% to 90%, based on the overall height of the stirring vessel. The diameter of the stirring disk is preferably greater than the distance between the stirring disk and the base of the stirring vessel. The dispersing of step (1) takes place preferably such that a toroidal flow pattern is produced, i.e., a donut effect is observed. This term is familiar to the skilled person.

The aqueous dispersion (P) may be prepared using not only (P1), (P2) and water, along optionally with organic solvent as described above, but also at least one further component (C).

Component (C) is suitably and preferably an emulsifier, preferably an emulsifier different from the polymeric resin (P2). The optional component (C) is also different from the polymeric resin (P1). Two or more components (C) different from one another may also be used.

Any customary emulsifier known to the skilled person is suitable as component (C). Component (C) is preferably selected from the group consisting of lecithins and $C_{12}$-$C_{24}$ fatty alcohol polyglycol ethers. The polyglycol ethers used may have been completely or partly etherified with $C_{12}$-$C_{24}$ fatty alcohols. A suitable lecithin, i.e., a suitable phospholipid, is Lipotin® A, for example, which is available commercially. Also suitable is soya lecithin. Examples of suitable $C_{12}$-$C_{24}$ fatty alcohol polyglycol ethers are the commercially available products Lutensol® ON 60 and Lutensol® XP 70.

The dispersion (P) is prepared using at least one further component (C); the relative weight ratio of the polyester used as polymeric resin (P2) to the component (C) is preferably in the range from 50:1 to 1.5:1, more preferably in the range from 35:1 to 1.75:1, very preferably in the range from 30:1 to 1.5:1, especially preferably in the range from 10:1 to 4:1.

The at least one further component (C) is present in the aqueous dispersion (P) of the invention preferably in an amount of 0.1 to 10 wt %, more preferably of 0.1 to 7.5 wt %, very preferably of 1.5 to 5 wt %, based in each case on the total weight of the aqueous dispersion (P).

The at least one further component (C) is present in the coating composition of the invention preferably in an amount of 0.05 to 5 wt %, very preferably of 0.05 to 3 wt %, based in each case on the total weight of the coating composition.

The relative weight ratio of the polymeric resins (P2) and (P1) to one another, based in each case on their solids content, in the dispersion (P) is in a range preferably from 15:1 to 1:1, more preferably in a range from 12.5:1 to 1.1:1, very preferably in a range from 10:1 to 1.5:1, more preferably still in a range from 8:1 to 1.5:1, more particularly in a range from 7:1 to 1.5:1, most preferably in a range from 6.5:1 to 1.5:1.

The polyamide used as polymeric resin (P1) is preferably present, based on its solids content, in the dispersion (P) in an amount in a range from 0.1 to 15 wt %, more preferably from 0.2 to 12.5 wt %, very preferably from 0.5 to 10 wt %, more preferably still from 0.75 to 9 wt %, most preferably from 1 to 8 wt % or from 1 to 7 wt %, based in each case on the total weight of the dispersion (P).

The polyester used as polymeric resin (P2) is preferably present, based on its solids content, in the dispersion (P) in an amount in a range from 2.5 to 25 wt %, more preferably from 3.5 to 22.5 wt %, very preferably from 4.5 to 20 wt %, more preferably still from 5 to 19 wt %, most preferably from 6 to 18 wt %, based in each case on the total weight of the dispersion (P).

Polymeric Resin (P1)

The polyamide used as polymeric resin (P1) has an acid number <10 mg of KOH per g of polyamide. The polyamide used as polymeric resin (P1) preferably has an acid number <9 mg of KOH per g of polyamide, more preferably <8 mg of KOH per g of polyamide, very preferably ≤7 mg of KOH per g of polyamide. The polymeric resin (P1) preferably has an acid number in a range from 0 to <10.0 mg of KOH per g of polyamide, more preferably in a range from 0.1 to <10.0 mg of KOH per g of polyamide, very preferably in a range from 0.1 to <9.0 mg of KOH per g of polyamide, most preferably in a range from 0.1 to 8.0 mg of KOH per g of polyamide. In a further preferred embodiment, the polymeric resin (P1) has an acid number in a range from 0.1 to <10 mg of KOH per g of polyamide, more preferably in a range from 0.1 to 9 mg or from 0.5 to 9 mg of KOH per g of polyamide, very preferably in a range from 0.1 to 8 mg or from 0.5 to 8 mg of KOH per g of polyamide, especially preferably in a range from 0.1 to ≤7 mg or from 0.5 to ≤7 mg of KOH per g of polyamide. The acid number is determined by the method described hereinafter.

Any customary polyamide known to the skilled person may be used as polymeric resin (P1), provided this polyamide has an acid number <10 mg of KOH per g of polyamide. The polyamide in question may be a polyamide homopolymer or copolymer. Also possible is the use of a mixture of two or more different polyamides as polymeric resin component (P1).

The polyamide used as polymeric resin (P1) preferably has an amine number <9 mg of KOH per g of polyamide, more preferably <8 mg of KOH per g of polyamide, very preferably ≤7 mg of KOH per g of polyamide. The polyamide used as polymeric resin (P1) preferably has an amine number in a range from 0.1 to <10 mg of KOH per g of polyamide, more preferably in a range from 0.1 to 9 mg or from 0.5 to 9 mg of KOH per g of polyamide, very preferably in a range from 0.1 to 8 mg or from 0.5 to 8 mg of KOH per g of polyamide, especially preferably in a range from 0.1 to ≤7 mg or from 0.5 to ≤7 mg of KOH per g of polyamide. The skilled person is aware of methods for determining the amine number. The amine number is determined preferably to DIN 16945 (Date: March 1989).

The polyamide used as polymeric resin (P1) preferably has a number-average molecular weight in a range from 100 g/mol to 5000 g/mol, more preferably in a range from 150 g/mol to 4000 g/mol, very preferably in a range from 200 g/mol to 3000 g/mol, especially in a range from 250 g/mol to 2000 g/mol, most preferably in a range from 400 g/mol to 1500 g/mol. The skilled person is aware of methods for determining the number-average molecular weight. The number-average molecular weight is determined in accordance with the method hereinafter.

The polyamide used inventively as polymeric resin (P1) is preferably obtainable by reaction of at least one polycarboxylic acid (C1a) with at least one polyamine (C1b), optionally in the presence of at least one monocarboxylic acid, more particularly at least one $C_{12}$-$C_{24}$ monocarboxylic acid, and/or of at least one monoamine such as a $C_2$-$C_{12}$ monoamine, for example.

The polyamide used inventively as polymeric resin (P1) is preferably obtainable by reaction of at least one polycarboxylic acid (C1a) selected from the group consisting of aliphatic $C_3$-$C_{22}$ dicarboxylic acids, polymers such as dimers and trimers of aliphatic $C_{12}$-$C_{24}$ monocarboxylic acids, and mixtures thereof, with at least one aliphatic $C_2$-$C_{12}$ diamine (C1b).

The reaction of at least one polycarboxylic acid (C1a) and at least one polyamine (C1b) is carried out preferably in a solvent, which is preferably an organic solvent.

The polyamide used inventively as polymeric resin (P1) is preferably obtainable by reaction of at least one polycarboxylic acid (C1a), preferably at least one polycarboxylic acid selected from the group consisting of aliphatic $C_3$-$C_{22}$ dicarboxylic acids, polymers such as dimers and trimers of aliphatic $C_{12}$-$C_{24}$ monocarboxylic acids, and mixtures thereof, with at least one polyamine (C1b), preferably with at least one aliphatic $C_2$-$C_{12}$ diamine (C1b), the reaction product then obtained being optionally contacted subsequently with at least one, preferably basic, neutralizing agent. The acid number of the resulting reaction product may be adjusted by reaction of free carboxyl groups with the neutralizing agent so as to allow an acid number <10 mg KOH/g reaction product to be obtained.

The polyamide used inventively as polymeric resin (P1) is available commercially: examples include the commercially available products Thixatrol® P220X-MF, Disparlon® A6900-20X, Disparlon® A650-20X, Disparlon® A670-20M, Disparlon F-9030, Disparlon® 6900-20X, Luvotix® AB, Luvotix® PA 20 XA, Luvotix® R-RF, Luvotix® HT-SF, Luvotix® HAT 400, Luvotix® HT, Troythix® 250 XF, Byk-430, and Byk-431.

Polymeric Resin (P2)

Any customary polyester known to the skilled person may be used as polymeric resin (P2), provided this polyester is at least obtainable by reaction of at least one polymerized aliphatic $C_{12}$-$C_{24}$ monocarboxylic acid with at least one diol and/or polyol. The polyester in question may be a polyester homopolymer or copolymer. A mixture of two or more different polyesters may also be used as polymeric resin component (P2). The term "at least obtainable" is understood in this respect, in the sense of the present invention, to mean that as well as the at least one polymerized aliphatic $C_{12}$-$C_{24}$ monocarboxylic acid and the at least one diol and/or polyol, further starting components as well may optionally be used for preparing the polyester (P2), such as, for example, at least one aliphatic $C_{12}$-$C_{24}$ monocarboxylic acid and/or such as at least one dicarboxylic acid and/or at least one tricarboxylic acid selected from the group consisting of aliphatic $C_3$-$C_{12}$ dicarboxylic acids, cycloaliphatic $C_5$-$C_{12}$ dicarboxylic acids, aromatic $C_8$-$C_{12}$ dicarboxylic acids, aliphatic $C_5$-$C_{12}$ tricarboxylic acids, cycloaliphatic $C_6$-$C_{12}$ tricarboxylic acids, and aromatic $C_9$-$C_{12}$ tricarboxylic acids.

The polymeric resin (P2) serves preferably as an emulsifier for transferring the polymeric resin (P1) into an aqueous phase.

The polyester used as polymeric resin (P2) preferably has an acid number in a range from 20 to 50 mg of KOH per g of polyester. More preferably the polyester used as polymeric resin (P2) has an acid number in a range from 20 to 45 mg of KOH per g of polyester, very preferably in a range from 25 to 40 mg of KOH per g of polyester, especially preferably in a range from 30 to 38 mg of KOH per g of polyester. The skilled person is aware of methods for determining the acid number. The acid number is determined in accordance with the method described hereinafter.

The polyester used as polymeric resin (P2) preferably has an OH number (hydroxyl number) in a range from 20 to 300 mg of KOH per g of polyester. Very preferably the polyester used as polymeric resin (P2) has an OH number in a range from 25 to 250 mg of KOH per g of polyester, very preferably in a range from 25 to 200 mg of KOH per g of polyester, especially preferably in a range from 25 to 150 mg of KOH per g of polyester, or in a range from 30 to 120 mg of KOH per g of polyester. The skilled person is aware of methods for determining the OH number. The OH number is determined in accordance with the method described hereinafter.

In another preferred embodiment, the polyester used as polymeric resin (P2) has an OH number of at most 300 mg of KOH, more preferably of at most 250 mg of KOH, very preferably of at most 200 mg of KOH, more preferably still of at most 150 mg of KOH, especially preferably of at most 120 mg of KOH, in each case per g of polyester.

The polyester used as polymeric resin (P2) preferably has an acid number in a range from 20 to 50 mg of KOH per g of polyester, more preferably in a range from 20 to 45 mg of KOH per g of polyester, very preferably in a range from 25 to 40 mg of KOH per g of polyester, especially preferably in a range from 30 to 38 mg of KOH per g of polyester, and/or a hydroxyl number in a range from 20 to 300 mg of KOH per g of polyester, more preferably in a range from 25 to 250 mg of KOH per g of polyester, very preferably in a range from 25 to 200 mg of KOH per g of polyester, especially preferably in a range from 25 to 150 mg of KOH per g of polyester, or in a range from 30 to 120 mg of KOH per g of polyester.

The polyester used as polymeric resin (P2) preferably has a number-average molecular weight in a range from 500 g/mol to 100 000 g/mol, more preferably in a range from 700 g/mol to 90 000 g/mol, very preferably in a range from 1000 g/mol to 80 000 g/mol, especially preferably in a range from 1000 g/mol to 60 000 g/mol or in a range from 2000 g/mol to 60 000 g/mol or in a range from 2000 g/mol to 50 000 g/mol, most preferably in a range from 2000 g/mol to 10 000 g/mol, or in a range from 2000 g/mol to 6000 g/mol. The skilled person is aware of methods for determining the number-average molecular weight. The number-average molecular weight is determined by the method hereinafter.

The polyester used inventively as polymeric resin (P2) is at least obtainable by reaction of at least one polymerized aliphatic $C_{12}$-$C_{24}$ monocarboxylic acid with at least one diol and/or polyol. It is possible here in each case to use not only the free acids but also corresponding suitable derivatives such as corresponding esters and/or anhydrides and also corresponding salts.

The term "polymerized aliphatic $C_{12}$-$C_{24}$ monocarboxylic acid" refers in the sense of the present invention preferably to a polymer, more particularly a dimer and/or trimer, of an aliphatic $C_{12}$-$C_{24}$ monocarboxylic acid. This term is known to the skilled person.

Also known to the skilled person are preparation processes for providing polymers, more particularly dimers and trimers, of aliphatic $C_{12}$-$C_{24}$ monocarboxylic acids, i.e., for providing polymerized aliphatic $C_{12}$-$C_{24}$ monocarboxylic acids, such as, for example, dimerized, trimerized and/or more highly polymerized, especially dimerized and/or trimerized, aliphatic $C_{12}$-$C_{24}$ monocarboxylic acids, from DE 25 06 211 A1, U.S. Pat. No. 2,793,219 A, and U.S. Pat. No. 2,955,121 A, for example. The polymerized aliphatic $C_{14}$-$C_{22}$ monocarboxylic acids may optionally be substituted one or more times, as for example two, three, four, or five times, preferably by at least one substituent selected from the group consisting of OH, O—$C_{1-4}$ aliphatic radicals, =O, $NH_2$, $NH(C_{1-4}$ aliphatic radicals), $N(C_{1-4}$ aliphatic radicals), it being possible for the substitution to be on the same or on different carbon atoms. Starting material used for preparing such polymerized aliphatic $C_{12}$-$C_{24}$ monocarboxylic acids are at least monounsaturated aliphatic $C_{12}$-$C_{24}$ monocarboxylic acids. The polymerized, such as dimerized and trimerized, aliphatic $C_{12}$-$C_{24}$ monocarboxylic acids obtained may in each case be separated by distillation from one another and also from higher polyvalent polymerization products, and may be subjected, optionally, to further conversion reactions, such as hydrogenations, for example.

The at least one polymerized aliphatic $C_{12}$-$C_{24}$ monocarboxylic acid used for preparing the polyester employed as polymeric resin (P2) is preferably a dimerized and/or trimerized, more particularly at least one dimerized, $C_{12}$-$C_{24}$ monocarboxylic acid.

Polymerized, especially dimerized and trimerized, $C_{12}$-$C_{24}$ monocarboxylic acids are available commercially. Examples of commercial dimerized fatty acids are the products Empol 1003, Empol 1005, Empol 1008, Empol 1012, Empol 1016, Empol 1026, Empol 1028, Empol 1061, Empol 1062, Pripol 1006, Pripol 1009, Pripol 1012, Pripol 1013, Pripol 1017, Pripol 1022, Pripol 1025, and Pripol 1027 from Croda, and examples of commercially available trimerized fatty acids are the products Empol 1043 from BASF and Pripol 1040 from Croda.

The term "aliphatic $C_{12}$-$C_{24}$ monocarboxylic acid" is understood in the sense of the present invention to refer preferably to a saturated or unsaturated, preferably unsaturated, aliphatic $C_{12}$-$C_{24}$ monocarboxylic acid having a total of 12-24, i.e., 12, 13, 14, 15, 16, 17, 18, 19, 20, 21, 22, 23, or 24 carbon atoms, preferably an aliphatic $C_{14}$-$C_{22}$ monocarboxylic acid having a total of 14-22, i.e., 14, 15, 16, 17, 18, 19, 20, 21, or 22 carbon atoms, or an aliphatic $C_{16}$-$C_{20}$ monocarboxylic acid having a total of 16-20, i.e., 16, 17, 18, 19, or 20 carbon atoms, having in each case exactly one —C(=O)—OH group, i.e., an aliphatic $C_{12}$-$C_{24}$ monocarboxylic acid which as well as this one —C(=O)—OH group has a $C_{11}$-$C_{23}$ aliphatic radical having a total of 11-23, i.e., 11, 12, 13, 14, 15, 16, 17, 18, 19, 20, 21, 22, or 23 carbon atoms, preferably a $C_{13}$-$C_{21}$ aliphatic radical having a total of 13-21, i.e., 13, 14, 15, 16, 17, 18, 19, 20, or 21 carbon atoms, or a $C_{15}$-$C_{19}$ aliphatic radical having a total of 15-19, i.e., 15, 16, 17, 18, or 19, carbon atoms. The expression "aliphatic" here encompasses preferably acyclic saturated or unsaturated, preferably unsaturated, branched or unbranched aliphatic radicals. Unsaturated aliphatic radicals here have at least one, preferably 1, 2, 3, 4, or 5, more preferably 1, 2, 3, or 4, very preferably 1, 2, or 3, carbon double bond(s). The aliphatic $C_{12}$-$C_{24}$ monocarboxylic acids may be natural or synthesized fatty acids. The aliphatic $C_{12}$-$C_{24}$ monocarboxylic acids may optionally be substituted one or more times, as for example two, three, four or five times, preferably by at least one substituent selected from the group consisting of OH, O—$C_{1-4}$ aliphatic radicals, =O, $NH_2$, $NH(C_{1-4}$ aliphatic radicals), $N(C_{1-4}$ aliphatic radicals), it being possible for the substitution to be on the same or on different carbon atoms. Preference is given to aliphatic $C_{12}$-$C_{24}$ monocarboxylic acids selected from the group consisting of myristic acid, pentadecanoic acid, palmitic acid, margaric acid, stearic acid, nonadecanoic acid, arachidic acid, henicosanoic acid, docosanoic acid, myristolenic acid, palmitoloic acid, petroselinic acid, oleic acid, elaidinic acid, vaccenic acid, gadoleinic acid, icosenoic acid, getoleinoic acid, erucaic acid, linoloic acid, linolenoic acid, calendulic acid, punicic acid, elaeostearic acid, arachidonic acid, timnodonic acid, clupanodonic acid, and cervonic acid, and also ricinolic acid. Preference is given to aliphatic $C_{16}$-$C_{20}$ monocarboxylic acids selected from the group consisting of palmitic acid, margaric acid, stearic acid, nonadecanoic acid, arachidic acid, palmitoleic acid, petroselinic acid, oleic acid, elaidinic acid, vaccenic acid, gadolenic acid, icosenic acid, linolic acid, linolenic acid, calendulic acid, punicic acid, elaeostearic acid, arachidonic acid, and timnodonic acid, and also ricinolic acid. Preference is given to aliphatic $C_{18}$ monocarboxylic acids selected from the group consisting of stearic acid, petroselinic acid, oleic acid, elaidinic acid, vaccenic acid, linolic acid, linolenic acid, calendulic acid, punicic acid, and elaeostearic acid, and also ricinolic acid, more particularly selected from the group consisting of stearic acid, oleic acid, linolic acid, and linolenic acid, and also ricinolic acid, most preferably selected from the group consisting of oleic acid, linolic acid, and linolenic acid, and also ricinolic acid.

The polyester used as polymeric resin (P2) is preferably at least obtainable by reaction of at least one aliphatic polymerized, preferably at least one dimerized and/or trimerized, aliphatic C12-$C_{24}$ monocarboxylic acid and optionally at least one aliphatic $C_{12}$-$C_{24}$ monocarboxylic acid with at least one $C_2$-$C_{20}$ polyol and/or $C_2$-$C_{20}$ diol.

The structural units obtainable from the at least one polymerized aliphatic $C_{12}$-$C_{24}$ monocarboxylic acid used for preparing the polyester employed as polymeric resin (P2) are present in the polyester preferably in an amount in a range from 10 to 40 mol %, based on the total weight of the polyester. More preferably the at least one polymerized aliphatic $C_{12}$-$C_{24}$ monocarboxylic acid used for preparing the polyester employed as polymeric resin (P2) is a dimerized and/or trimerized $C_{12}$-$C_{24}$ monocarboxylic acid, and the structural units obtainable therefrom are present in the polyester in an amount in a range from 10 to 80 mol %, preferably 10 to 60 mol %, more preferably 10 to 40 mol %, based on the total weight of the polyester. To a skilled person here it is clear that the polymerized aliphatic $C_{12}$-$C_{24}$ monocarboxylic acid used is not integrated completely into the polyester, but instead that in the reaction of the at least one polyol and/or diol with the at least one polymerized aliphatic $C_{12}$-$C_{24}$ monocarboxylic acid, the structural units present in the polyester are only built up with elimination of water, through formation of ester bonds. More preferably the at least one polymerized aliphatic $C_{12}$-$C_{24}$ monocarboxylic acid used for preparing the polyester employed as polymeric resin (P2) is a dimerized and/or trimerized $C_{12}$-$C_{24}$ monocarboxylic acid, and the structural unit obtainable therefrom is present in the polyester in an amount in a range from 12 to 38 mol %, very preferably in a range from 14 to 36 mol % or in a range from 16 to 34 mol % or in a range from 18 to 32 mol % or in a range from 20 to 30 mol % or in a range from 22 to 28 mol %, especially preferably in a range from 23 to 26 mol %, based in each case on the total weight of the polyester.

The term "polyol" in the sense of the present invention refers preferably to a component which has at least three, preferably primary, hydroxyl groups. Overall, however, a polyol may have preferably up to and including 10 hydroxyl groups—that is, in addition to the at least two primary hydroxyl groups, it may also contain up to and including 8 further hydroxyl groups. The term "polyol" therefore embraces, in particular, triols. A "polyol" in the sense of the present invention may be a (hetero)aliphatic, (hetero)cycloaliphatic, or (hetero)aromatic polyol. Used with preference as polyol is an aliphatic, preferably saturated, polyol. The polyol is preferably a triol. The inventively employed polyols preferably have 2 to 20, more preferably 2 to 12, carbon atoms per molecule, i.e., they are preferably $C_2$-$C_{20}$ polyols, more preferably $C_2$-$C_{12}$ polyols. The polyol may optionally be substituted one or more times, as for example two, three, four, or five times, preferably by at least one substituent selected from the group consisting of OH, O—$C_{1-4}$ aliphatic radicals, =O, $NH_2$, NH($C_{1-4}$ aliphatic radicals), N($C_{1-4}$ aliphatic radicals), it being possible for the substitution to be on the same or on different carbon atoms.

The term "diol" refers in the sense of the present invention preferably to a component which has two, preferably primary, hydroxyl groups. A "diol" in the sense of the present invention may be a (hetero)aliphatic, (hetero)cycloaliphatic, or (hetero)aromatic diol. The diol used is preferably an aliphatic, preferably saturated, diol. The inventively employed diols preferably have 2 to 20, more preferably 2 to 12, carbon atoms per molecule, i.e., they are preferably $C_2$-$C_{20}$ diols, more preferably $C_2$-$C_{12}$ diols. The diol may optionally be substituted one or more times, as for example two, three, four, or five times, preferably by at least one substituent selected from the group consisting of OH, O—$C_{1-4}$ aliphatic radicals, =O, $NH_2$, NH($C_{1-4}$ aliphatic radicals), N($C_{1-4}$ aliphatic radicals), it being possible for the substitution to be on the same or on different carbon atoms.

With particular preference the diol and/or polyol used for preparing the polyester employed inventively as polymeric resin (P2) is selected from the group consisting of aliphatic $C_2$-$C_{20}$ polyols and/or aliphatic $C_2$-$C_{20}$ diols. Very preferably, the diol used to prepare the polyester employed inventively as polymeric resin (P2) is selected from the group consisting of aliphatic $C_2$-$C_{12}$ diols.

The term "aliphatic $C_2$-$C_{20}$ polyol" or "aliphatic $C_2$-$C_{20}$ diol" refers in the sense of the present invention preferably to a saturated or unsaturated, preferably a saturated, aliphatic $C_2$-$C_{20}$ polyol or $C_2$-$C_{20}$ diol, respectively, having a total of 2-20, i.e., 2, 3, 4, 5, 6, 7, 8, 9, 10, 11, 12, 13, 14, 15, 16, 17, 18, 19, or 20, carbon atoms, preferably an aliphatic $C_2$-$C_{12}$ polyol or aliphatic $C_2$-$C_{12}$ diol, respectively, having a total of 2-12, i.e., 2, 3, 4, 5, 6, 7, 8, 9, 10, 11, or 12, carbon atoms, and having in each case precisely two, preferably terminal, —OH groups. The expression "aliphatic" here encompasses preferably acyclic saturated or unsaturated, preferably saturated, branched or unbranched aliphatic radicals. Unsaturated aliphatic radicals in this context have at least one, preferably 1, 2, 3, 4, or 5, more preferably 1, 2, 3, or 4, very preferably 1, 2, or 3 carbon double bond(s). The aliphatic $C_2$-$C_{20}$ polyol or $C_2$-$C_{20}$ diol may optionally be substituted one or more times, as for example two, three, four, or five times, preferably by at least one substituent selected from the group consisting of OH, O—$C_{1-4}$ aliphatic radicals, =O, $NH_2$, NH($C_{1-4}$ aliphatic radicals), N($C_{1-4}$ aliphatic radicals), it being possible for the substitution to be on the same or on different carbon atoms. The aliphatic $C_2$-$C_{20}$ polyols are preferably selected from the group consisting of ethylene glycol, propylene glycol (1,2-propanediol), trimethylene glycol (1,3-propanediol), 1,4-dihydroxybutane (1,4-butanediol), 1,5-dihydroxypentane, 1,6-dihydroxyhexane (1,6-hexanediol), neopentyl glycol, and 1,1,1-trimethylolpropane (TMP). The aliphatic $C_2$-$C_{20}$ diols are preferably selected from the group consisting of ethylene glycol, propylene glycol (1,2-propanediol), trimethylene glycol (1,3-propanediol), 1,4-dihydroxybutane (1,4-butanediol), 1,5-dihydroxypentane, 1,6-dihydroxyhexane (1,6-hexanediol), and neopentyl glycol.

To prepare the polyester used as polymeric resin (P2) it is possible optionally—besides the at least one polymerized aliphatic $C_{12}$-$C_{24}$ monocarboxylic acid and the at least one diol and/or polyol—to use, moreover, at least one aliphatic $C_{12}$-$C_{24}$ monocarboxylic acid, preferably at least one aliphatic $C_{16}$-$C_{20}$ monocarboxylic acid. It is possible here to use the same aliphatic $C_{12}$-$C_{24}$ monocarboxylic acids that are also suitable for preparing aliphatic polymerized $C_{12}$-$C_{24}$ monocarboxylic acids. Especially suitable for this purpose is at least one such aliphatic $C_{12}$-$C_{24}$ monocarboxylic acid, preferably at least one such aliphatic $C_{16}$-$C_{20}$ monocarboxylic acid which is at least monounsaturated and/or whose aliphatic radical is substituted by at least one OH group. An example of one such aliphatic $C_{12}$-$C_{24}$ monocarboxylic acid is ricinolic acid. Optionally at least one aliphatic $C_{12}$-$C_{24}$ monocarboxylic acid used for preparing the polyester employed as polymeric resin (P2) is used, and the structural unit obtainable therefrom is present in the polyester in an amount in a range from 0 to 20 mol %, very preferably in a range from 0 to 10 mol %, based in each case on the total weight of the polyester.

To prepare the polyester employed as polymeric resin (P2) it is possible optionally to use at least one further component. For preparing the polyester employed as polymeric resin (P2), it is preferred to make use further of at least one dicarboxylic acid and/or at least one tricarboxylic acid—or suitable employable derivatives thereof such as corresponding anhydrides and/or esters, for example—selected from the group consisting of aliphatic $C_3$-$C_{12}$ dicarboxylic acids, cycloaliphatic $C_5$-$C_{12}$ dicarboxylic acids, aromatic $C_8$-$C_{12}$ dicarboxylic acids, aliphatic $C_5$-$C_{12}$ tricarboxylic acids, cycloaliphatic $C_6$-$C_{12}$ tricarboxylic acids, and aromatic $C_9$-$C_{12}$ tricarboxylic acids, more preferably selected from the group consisting of cycloaliphatic $C_5$-$C_{12}$ dicarboxylic acids and aromatic $C_9$-$C_{12}$ tricarboxylic acids and aromatic $C_8$-$C_{12}$ dicarboxylic acids. The polyester used as polymeric resin (P2) preferably comprises 3 to 40 mol %, more preferably 5 to 30 mol %, based on the total fraction of 100 mol % of all structural units in the polyester, of structural units which result from the use of at least one dicarboxylic acid and/or at least one tricarboxylic acid for preparing the polyester.

Preferably, to prepare the polyester employed as polymeric resin (P2), use is made further of at least one dicarboxylic acid and/or at least one tricarboxylic acid selected from the group consisting of aliphatic $C_3$-$C_{12}$ dicarboxylic acids, cycloaliphatic $C_5$-$C_{12}$ dicarboxylic acids, aromatic $C_8$-$C_{12}$ dicarboxylic acids, aliphatic $C_5$-$C_{12}$ tricarboxylic acids, cycloaliphatic $C_6$-$C_{12}$ tricarboxylic acids, and aromatic $C_9$-$C_{12}$ tricarboxylic acids, and optionally, additionally, of at least one aliphatic $C_{12}$-$C_{24}$ monocarboxylic acid.

The term "aliphatic $C_3$-$C_{12}$ dicarboxylic acid" refers in the sense of the present invention preferably to a saturated or unsaturated, preferably saturated, aliphatic $C_3$-$C_{12}$ dicarboxylic acid having a total of 3 to 12, i.e., 3, 4, 5, 6, 7, 8, 9, 10, 11, or 12 carbon atoms, having in each case precisely two —C(═O)—OH groups, i.e., for example, an aliphatic $C_3$-$C_{22}$ dicarboxylic acid which as well as these two —C(═O)—OH groups has a C1-$C_{20}$ aliphatic radical having a total of 1 to 20 carbon atoms. The expression "aliphatic" here encompasses preferably acyclic saturated or unsaturated, preferably unsaturated, branched or unbranched aliphatic radicals. To the skilled person it is clear that an unsaturated bond within the $C_3$-$C_{22}$ dicarboxylic acid is possible only for $C_4$-$C_{22}$ dicarboxylic acids. Unsaturated aliphatic radicals here have at least one, preferably 1, 2, 3, 4, or 5, preferably 1, 2, 3, or 4, very preferably 1, 2, or 3, carbon double bond(s). The aliphatic $C_3$-$C_{22}$ dicarboxylic acids may be natural or synthesized dicarboxylic acids. The aliphatic $C_3$-$C_{22}$ dicarboxylic acids may optionally be substituted one or more times, as for example two, three, four, or five times, preferably by at least one substituent selected from the group consisting of OH, O—$C_{1-4}$ aliphatic radicals, ═O, $NH_2$, $NH(C_{14}$ aliphatic radicals), $N(C_{1-4}$ aliphatic radicals), it being possible for substitution to be on the same or on different carbon atoms. Preference is given to aliphatic $C_3$-$C_{22}$ dicarboxylic acids selected from the group consisting of malonic acid, succinic acid, glutaric acid, adipic acid, pimelic acid, suberic acid, azelaic acid, sebacic acid, undecanedicarboxylic acid, dodecanedicarboxylic acid, tridecanedicarboxylic acid, tetradecane-dicarboxylic acid, and hexadecanedicarboxylic acid.

In contrast to the aliphatic $C_3$-$C_{12}$ dicarboxylic acids, aliphatic $C_5$-$C_{12}$ tricarboxylic acids have at least 5 carbon atoms and three instead of two carboxyl groups.

The term "cycloaliphatic $C_5$-$C_{12}$ dicarboxylic acid" refers in the sense of the present invention preferably to a saturated or unsaturated, preferably saturated, cycloaliphatic $C_5$-$C_{12}$ dicarboxylic acid having a total of 5-12, i.e., 5, 6, 7, 8, 9, 10, 11, or 12, carbon atoms, having in each case precisely two —C(═O)—OH groups, i.e., for example, a cycloaliphatic $C_5$-$C_{12}$ dicarboxylic acid which as well as these two —C(═O)—OH groups has a $C_3$-$C_{10}$ cycloaliphatic radical having a total of 3 to 10 carbon atoms. The expression "cycloaliphatic" here encompasses preferably cyclic saturated or unsaturated, preferably unsaturated, cycloaliphatic radicals. The cycloaliphatic $C_5$-$C_{12}$ dicarboxylic acids may optionally be substituted one or more times, as for example two, three, four, or five times, preferably by at least one substituent selected from the group consisting of OH, O—$C_{1-4}$ aliphatic radicals, ═O, $NH_2$, $NH(C_{1-4}$ aliphatic radicals), $N(C_{1-4}$ aliphatic radicals), it being possible for the substitution to be on the same or on different carbon atoms. Preferred are cycloaliphatic $C_5$-$C_{12}$-dicarboxylic acids selected from the group consisting of hexahydrophthalic acid and hexahydrophthalic anhydride, hexahydroterephthalic acid and hexahydroterephthalic anhydride, and hexahydroisophthalic acid and hexahydroisophthalic anhydride. Cycloaliphatic $C_6$-$C_{12}$ tricarboxylic acids differ from the cycloaliphatic $C_5$-$C_{12}$ dicarboxylic acids in having at least 6 carbon atoms and three instead of two carboxyl groups.

The term "aromatic $C_8$-$C_{12}$ dicarboxylic acid" refers in the sense of the present invention preferably to an aromatic $C_8$-$C_{22}$ dicarboxylic acid having a total of 8-12, i.e., 8, 9, 10, 11, or 12 carbon atoms, having in each case precisely two —C(═O)—OH groups, i.e., for example, an aromatic $C_8$-$C_{12}$ dicarboxylic acid which in addition to these two —C(═O)—OH groups has a $C_6$-$C_{10}$ aromatic radical having a total of 6 to 10 carbon atoms. The aromatic $C_8$-$C_{12}$ dicarboxylic acid may optionally be substituted one or more times, as for example two, three, four, or five times, preferably by at least one substituent selected from the group consisting of OH, O—$C_{1-4}$ aliphatic radicals, ═O, $NH_2$, $NH(C_{1-4}$ aliphatic radicals), $N(C_{1-4}$ aliphatic radicals), it being possible for the substitution to be on the same or on different carbon atoms. The aromatic $C_8$-$C_{12}$ dicarboxylic acids are preferably selected from the group consisting of terephthalic acid, isophthalic acid, ortho-phthalic acid and/or trimellitic acid, and/or their anhydrides and/or esters. Aromatic $C_9$-$C_{12}$ tricarboxylic acids differ from the aromatic $C_8$-$C_{12}$-dicarboxylic acids in having at least 9 carbon atoms and three instead of two carboxyl groups.

The skilled person knows of suitable polyesters which can be used as polymeric resin (P2), and of their preparation, from DE 40 09 858 A1, for example.

Use of the Aqueous Dispersion as Rheological Assistant

A further subject of the present invention is a use of the dispersion (P) of the invention as a rheological assistant in aqueous coating compositions. "Rheological assistants" in the sense of the present invention are preferably rheological assistants selected from the group consisting of thixotropic agents, thickeners and flow control assistants, and mixtures thereof, more preferably thickeners.

All preferred embodiments described above in connection with the aqueous dispersion (P) of the invention are also preferred embodiments with regard to a use of this aqueous dispersion (P) of the invention as a rheological assistant in aqueous coating compositions.

Coating Composition

The aqueous dispersion (P) of the invention is suitable as a component in an aqueous coating composition which can be employed in particular for at least partly coating an optionally coated substrate with a basecoat film.

A further subject of the present invention, therefore, is an aqueous coating composition comprising
the aqueous dispersion (P) of the invention, comprising at least one polymeric resin (P1) and at least one polymeric resin (P2) different therefrom,
at least one binder (A) comprising at least one polymeric resin (A1) which is different from the polymeric resins (P1) and (P2), and optionally at least one crosslinking agent (A2), and
at least one pigment (B)
for at least partly coating an optionally coated substrate with a basecoat film.

The aqueous coating composition of the invention is therefore preferably an aqueous basecoat composition, i.e., a coating composition which is suitable for producing an aqueous basecoat film. The term "basecoat" is known to the skilled person and defined for example in Römpp Lexikon, Lacke und Druckfarben, Georg Thieme Verlag 1998.

The fractions in wt % of the (P1), (P2), (A1), (B), and water components present in the coating composition of the invention, and also of the components (C) and/or (D) and/or (E), where present, and also of any organic solvents and/or component (A2) present, add up preferably to 100 wt %, based on the total weight of the coating composition.

The term "comprising" in the sense of the present invention, in connection with the coating composition of the invention, has in one preferred embodiment the meaning "consisting of". In this context, with regard to the coating composition of the invention, in this preferred embodiment, one or more of the further components stated below and present optionally in the coating composition used in accordance with the invention may be present in the coating composition, such as, for example—in addition to the water, (P1), (P2), (A1), and (B) components—optionally (A2) and/or (C) and/or (D) and/or (E) and/or organic solvent(s). All components here may in each case be present in their above-mentioned and below-mentioned, preferred embodiments in the coating composition of the invention.

The aqueous coating composition of the invention comprises water as liquid diluent.

The term "aqueous" in connection with the coating composition of the invention refers preferably to liquid coating compositions which comprise as their liquid diluent, i.e., as the liquid solvent and/or dispersion medium, water as principal component. Optionally, however, the coating compositions of the invention may comprise organic solvents in said proportions. Examples of such organic solvents include (hetero)cyclic, (hetero)aliphatic, or (hetero)aromatic hydrocarbons, mono- or polyfunctional alcohols, ethers, esters, ketones and amides, such as N-methylpyrrolidone, N-ethylpyrrolidone, dimethylformamide, toluene, xylene, butanol, ethyl glycol and butyl glycol and also their acetates, butyl diglycol, diethylene glycol dimethyl ether, cyclohexanone, methyl ethyl ketone, methyl isobutyl ketone, acetone, isophorone, or mixtures thereof.

The fraction of these organic solvents is preferably at most 40.0 wt %, more preferably at most 35.0 wt %, very preferably at most 30.0 wt %, more particularly at most 25.0 wt % or at most 20.0 wt %, or at most 15.0 wt %, more preferably still at most 10.0 wt %, based in each case on the total fraction of the liquid diluents—that is liquid solvents and/or dispersion media—that are present in the coating composition of the invention. The fraction of organic solvents in the coating composition of the invention is more particularly at most in a range from 10.0 wt % to 40.0 wt %, based on the total fraction of the liquid diluents—that is, liquid solvents and/or dispersion media—that are present in the coating composition of the invention.

The coating composition of the invention preferably has a nonvolatile fraction in the range from 10 to 50 wt %, more preferably in the range from 10 to 45 wt %, very preferably in the range from 10 to 40 wt %, based on the total weight of the coating composition.

Binder (A)

The binder (A) used in the aqueous coating composition of the invention is preferably a binder which is dispersible or soluble in water.

The term "binder" refers in the sense of the present invention, in accordance with DIN EN ISO 4618 (German version, date: March 2007) preferably to those nonvolatile fractions of a coating composition that are responsible for film formation, with the exception of pigments (B) and any fillers present therein, more particularly to the polymeric resins that are responsible for film formation. The nonvolatile fraction may be determined in accordance with the method described below.

Suitable polymeric resins (A1) are all customary polymeric resins (A1) known to the skilled person, such as self-crosslinking and nonself-crosslinking polymeric resins (A1). If nonself-crosslinking polymeric resins (A1) are used, the binder (A) used in accordance with the invention may further comprise a crosslinking agent (A2). Suitable polymeric resins (A1) including crosslinking agents (A2) present optionally, are known from, for example, EP 0 228 003 A1, DE 44 38 504 A1, EP 0 593 454 B1, DE 199 48 004 A1, EP 0 787 159 B1, DE 40 09 858 A1, DE 44 37 535 A1, WO 92/15405 A1, and WO 2005/021168 A1, more particularly from EP 0 228 003 A1, DE 199 48 004 A1, DE 40 09 858 A1, and DE 44 37 535 A1.

The binder (A) preferably comprises at least one polymeric resin (A1), which optionally has reactive functional groups which permit a crosslinking reaction.

The polymeric resin (A1) is preferably different from polymeric resins (P1) and (P2).

The polymeric resin (A1) in the binder (A) used in accordance with the invention preferably has crosslinkable reactive functional groups. Any customary crosslinkable reactive functional group known to the skilled person is suitable in this context. The at least one polymeric resin in the binder (A) preferably has at least one kind of functional reactive groups selected from the group consisting of primary amino groups, secondary amino groups, hydroxyl groups, thiol groups, carboxyl groups, carbamate groups, groups which have at least one C=C double bond, such as vinyl groups or (meth)acrylate groups, for example, and epoxide groups. The polymeric resin (A1) in the binder (A) preferably has functional hydroxyl groups.

For the purposes of the present invention, the expression "(meth)acryl" or "(meth)acrylate" embraces in each case the definitions "methacrylic" and/or "acrylic" and "methacrylate" and/or "acrylate", respectively.

Where the polymeric resin (A1) in the binder (A) has crosslinkable functional groups such as hydroxyl groups, the fraction of crosslinkable functional groups such as hydroxyl groups is preferably in the range from 0.1 wt % to 7.0 wt %, more preferably from 0.25 to 6.5 wt %, very preferably from 0.50 to 6.0 wt %, more particularly from 0.75 to 5.5 wt %, based in each case on the total weight of the solids content of the polymeric resin (A1) in the binder (A).

The polymeric resin (A1) and the optionally present crosslinking agent (A2) are curable or crosslinkable exothermically or endothermically. The polymeric resin (A1) and the optionally present crosslinking agent (A2) are more particularly curable or crosslinkable thermally. The polymeric resin (A1) and the optionally present crosslinking agent (A2) are preferably curable or crosslinkable in a temperature range from −20° C. up to 250° C. The polymeric resin (A1) and the optionally present crosslinking agent (A2) are preferably crosslinkable at room temperature or at temperatures in the range from 15° C. to 80° C. Room temperature for the purposes of the present invention means preferably a temperature in the range from 18° C. to 23° C. Alternatively the polymeric resin (A1) and the optionally present crosslinking agent (A2) are crosslinkable only at higher temperatures, as for example at temperatures 80° C., more preferably ≤110° C., very preferably ≤140° C. or ≤150° C. With particular advantage the polymeric resin (A1) and the optionally present crosslinking agent (A2) are crosslinkable at 50 to 150° C., more preferably at 70 to 150° C., and very preferably at 80 to 150° C.

The binder (A) preferably comprises at least one polymeric resin (A1) selected from the group consisting of polyurethanes, polyesters, polyamides, polyureas, polystyrenes, polycarbonates, poly(meth)acrylates, vinyl ester-based resins, epoxy resins, phenol-formaldehyde resins, melamine-formaldehyde resins, phenolic resins, and silicone resins, and also mixtures thereof, with preferably 70 to 100 wt % of the polymeric resin being selected from at least one of the aforementioned polymers. Among the stated polymers, the reference is preferably in each case both to homopolymers and to copolymers. These resins and also their preparation are known to the skilled person. Polyesters which are suitable are known from DE 40 09 858 A1, for example. Suitable polyurethanes are known from DE 199 48 004 A1 and from EP 0 228 003 A1, for example. The term "polyurethanes" preferably includes, in particular, polyurethane poly(meth)acrylates, i.e., polyurethane-modified poly (meth)acrylates. Such polyurethane poly(meth)acrylates are known to the skilled person from DE 44 37 535 A1, for example.

The binder (A) preferably comprises at least one polymeric resin (A1) selected from the group consisting of polyurethanes, polyureas, polyesters, and poly(meth)acrylates, more particularly selected from the group consisting of polyurethanes and poly(meth)acrylates, with preferably 70 to 100 wt % of the polymeric resin in the binder being selected from at least one of the aforementioned polymers.

Also possible is the presence in the binder (A) of two or more different polymeric resins (A1), as for example two or three polymeric resins (A1) different from one another in each case.

In one particularly preferred embodiment, the binder (A) comprises, as polymeric resin (A1), at least one polyurethane, with preferably 70 to 100 wt % of the polymeric resin constituting such a polyurethane, and/or, as polymeric resin (A1), at least one poly(meth)acrylate, with preferably 70 to 100 wt % of the polymeric resin being selected from such a poly(meth)acrylate, and/or, as polymeric resin (A1), at least one polyester, with preferably 70 to 100 wt % of the polymeric resin being selected from such a polyester.

The binder (A) may comprise a polymeric resin (A1) which is cured or crosslinked with participation of isocyanate groups and/or oligomerized or polymerized isocyanate groups, very preferably at least one corresponding polyurethane and/or polyester and/or poly(meth)acrylate.

Where the binder (A) comprises at least one polyurethane as polymeric resin (A1), particular suitability is possessed by polyurethane-based resins which are prepared by a polyaddition reaction between hydroxyl-containing compounds such as polyols, including diols (such as, for example, hydroxyl groups of hydroxyl-containing polyesters or hydroxyl-containing polyethers and also mixtures and copolymers thereof) and at least one isocyanate or polyisocyanate (including aromatic and aliphatic isocyanates, di-, tri- and/or polyisocyanates). Normally this requires a stoichiometric conversion of the OH groups of the polyols with the isocyanate groups of the polyisocyanates. However, the stoichiometric ratio to be used may also be varied, since the polyisocyanate can be added to the polyol component in amounts such that there may be an "overcrosslinking" or an "undercrosslinking". Besides a reaction of isocyanate groups with OH groups, a further crosslinking reaction which may occur is, for example, the di- and trimerization of isocyanates (to form uretdiones or isocyanurates). Suitable polyisocyanates and isocyanates include all polyisocyanates and isocyanates, respectively, which can be employed and have been stated as crosslinking agents (A2).

Where the binder (A) comprises at least one polyurethane as polymeric resin (A1), it is suitably prepared using preferably a polyester polyol as prepolymer polyol component. Suitable polyester polyols include, in particular, compounds which derive from at least one polyol such as at least one diol, as for example ethylene glycol, propylene glycol (1,2-propanediol), trimethylene glycol (1,3-propanediol), neopentyl glycol, 1,4-butanediol and/or 1,6-hexanediol, or such as at least one triol such as 1,1,1-trimethylolpropane (TMP), and from at least one dicarboxylic acid such as, for example, adipic acid, terephthalic acid, isophthalic acid, ortho-phthalic acid and/or dimethylolpropionic acid and/or from at least one dicarboxylic acid derivative such as a dicarboxylic ester and/or a dicarboxylic anhydride such as phthalic anhydride. Especially preferred is a polyester polyol of this kind, used as prepolymer polyol component, which derives from at least one diol and/or triol selected from the group consisting of 1,6-hexanediol, neopentyl glycol, trimethylolpropane, and mixtures thereof, and from at least one dicarboxylic acid (or from at least one dicarboxylic acid derivative thereof) selected from the group consisting of adipic acid, terephthalic acid, isophthalic acid, ortho-phthalic acid, dimethylolpropionic acid, and mixtures thereof. Preference is given to using at least one such polyester polyol with at least one crosslinking agent (A2), more particularly with at least one polyisocyanate such as HDI or IPDI, for preparing the polyurethane resin which is encompassed by the binder (A).

In order to permit a solution or dispersion of a polyurethane resin and/or polyurea resin of this kind in water, it is usual to incorporate ionic and/or hydrophilic segments into the polyurethane and/or polyurea chain in order to stabilize the dispersion. Soft segments used in the case of polyurethanes may preferably be 20 to 100 mol % of relatively high molecular mass diols, based on the amount of all diols, preferably polyester diols, having a number-average molecular weight $M_n$ of 500 to 5000 g/mol, preferably of 1000 to 3000 g/mol. The number-average molecular weight is determined by the method described hereinafter.

Where the binder (A) comprises at least one polyester as polymeric resin (A1), the polyester polyols employed as polyester component may be those stated in connection with the preparation of the polyurethane resins.

Where the binder (A) comprises at least one poly(meth)acrylate-based polymeric resin as polymeric resin (A1), it is suitably prepared with, in particular, monomer mixtures or oligomer mixtures of esters such as $C_{1-6}$alkyl esters of acrylic acid and/or of methacrylic acid. Polymer synthesis is accomplished via the reaction of the C═C double bonds of these monomers. The preparation of such poly(meth)acrylate-based resins may be accomplished by means of a radical polymerization, which is initiated, for example, by the decomposition of organic peroxides.

Where the binder (A) comprises at least one poly(meth)acrylate-based polymeric resin as polymeric resin (A1), especially suitable poly(meth)acrylate-based polymeric resins are those preparable by multistage radical emulsion polymerization of olefinically unsaturated monomers in water. Particular preference is given to poly(meth)acrylate-based polymeric resins which are preparable by i. polymerization of a mixture of olefinically unsaturated monomers A by emulsion polymerization in water using emulsifier and a water-soluble initiator, ii. polymerization of a mixture of olefinically unsaturated monomers B by emulsion polymerization in water using emulsifier and a water-soluble initiator in the presence of the polymer obtained under i., this mixture of olefinically unsaturated monomers B preferably comprising at least one polyolefinically unsaturated monomer, iii. polymerization of a mixture of olefinically unsaturated monomers C by emulsion polymerization in water using an emulsifier and a water-soluble initiator in the presence of the polymer obtained under ii.

Suitable olefinically unsaturated monomers may be mono- or polyolefinically unsaturated. Examples of suitable monoolefinically unsaturated monomers are, in particular, (meth)acrylate-based monoolefinically unsaturated monomers such as, for example, (meth)acrylic acid and esters, nitriles, or amides of (meth)acrylic acid. Examples of suitable polyolefinically unsaturated monomers are esters of (meth)acrylic acid having an olefinically unsaturated radical. This radical may be an allyl radical or a (meth)acryloyl radical. Preferred polyolefinically unsaturated monomers are ethylene glycol di(meth)acrylate, propylene 1,2-glycol di(meth)acrylate, propylene 2,2-glycol di(meth)acrylate, butane-1,4-diol di(meth)acrylate, neopentyl glycol di(meth) acrylate, 3-methylpentanediol di(meth)acrylate, diethylene glycol di(meth)acrylate, triethylene glycol di(meth)acrylate, tetraethylene glycol di(meth)acrylate, dipropylene glycol di(meth)acrylate, tripropylene glycol di(meth)acrylate, hexanediol di(meth)acrylate and allyl (meth)acrylate. The monomer mixture A preferably comprises at least one monounsaturated ester of (meth)acrylic acid with an unsubstituted alkyl radical, and optionally further at least one vinylically monounsaturated monomer having an aromatic radical on the vinyl group. The monomer mixture B preferably comprises at least one polyolefinically unsaturated monomer, at least one monounsaturated ester of (meth)acrylic acid with an unsubstituted alkyl radical, and optionally at least one vinylically monounsaturated monomer having an aromatic radical on the vinyl group. The monomer mixture C preferably comprises at least one alpha-beta unsaturated carboxylic acid, at least one monounsaturated ester of (meth)acrylic acid with an alkyl radical substituted by one or more hydroxyl groups, at least one monounsaturated ester of (meth)acrylic acid with an unsubstituted alkyl radical, and optionally at least one vinylically monounsaturated monomer having an aromatic radical on the vinyl group.

Where the binder (A), in addition to at least one polymeric resin (A1), further comprises at least one crosslinking agent (A2), suitability for such an agent is possessed by all customary crosslinking agents known to the skilled person, such as, for example, aminoplast resins, phenoplast resins, polyfunctional Mannich bases, melamine resins, benzoguanamine resins, beta-hydroxyalkylamides, tris(alkoxycarbonylamino)triazines, epoxides, free polyisocyanates and/or blocked polyisocyanates, especially blocked polyisocyanates, and also compounds having on average at least two groups capable of transesterification, examples being reaction products of malonic diesters and polyisocyanates, or of polyhydric alcohol esters and partial esters of malonic acid with monoisocyanates. A particularly preferred crosslinking agent is a blocked polyisocyanate. Where blocked polyisocyanates are selected as crosslinking agents, the aqueous coating composition of the invention is formulated preferably as a one-component composition (1-K). Where non-blocked polyisocyanates are selected as crosslinking agents, the aqueous coating composition of the invention is formulated preferably as a two-component composition (2-K).

Employable with particular preference as crosslinking agents (A2) are melamine resins that are dispersible or soluble in water, preferably melamine-formaldehyde condensation products, more particularly etherified melamine-formaldehyde condensation products. The solubility or dispersibility in water of these products is dependent not only on the degree of condensation—which is to be as low as possible—but also on the etherifying component, with only the lowest members in the alkanol or ethylene glycol monoether series producing water-soluble condensates. The greatest significance is possessed by methanol-etherified (methylated) melamine resins. When solubilizers are used as optional further additives, it is also possible for ethanol-, propanol- and/or butanol-etherified melamine resins, more particularly the corresponding etherified melamine-formaldehyde condensation products, to be dissolved or dispersed in aqueous phase.

Isocyanates used are preferably (hetero)aliphatic, (hetero)cycloaliphatic, (hetero)aromatic, or (hetero)aliphatic-(hetero)aromatic isocyanates. Preferred are diisocyanates which contain 2 to 36, more particularly 6 to 15, carbon atoms. Preferred examples are 1,2-ethylene diisocyanate, 1,4-tetramethylene diisocyanate, 1,6-hexamethylene diisocyanate (HDI), 2,2,4-(2,4,4)-trimethyl-1,6-hexamethylene diisocyanate (TMDI), diphenylmethane diisocyanate (MDI), 1,9-diisocyanato-5-methylnonane, 1,8-diisocyanato-2,4-dimethyloctane, 1,12-dodecane diisocyanate, ω,ω'-diisocyanatodipropyl ether, cyclobutene 1,3-diisocyanate, cyclohexane 1,3- and -1,4-diisocyanate, 3-isocyanatomethyl-3,5,5-trimethyl-cyclohexyl isocyanate (isophorone diisocyanate, IPDI), 1,4-diisocyanatomethyl-2,3,5,6-tetramethylcyclohexane, decahydro-8-methyl (1,4-methanonaphthalene-2 (or 3), 5-ylenedimethylene diisocyanate, hexahydro-4,7-methanoindane-1 (or 2), 5 (or 6) ylenedimethylene diisocyanate, hexahydro-4,7-methanoindane-1 (or 2), 5 (or 6) ylene diisocyanate, 2,4- and/or 2,6-hexahydrotoluylene diisocyanate (H6-TDI), 2,4- and/or 2,6-toluene diisocyanate (TDI), perhydro-2,4'-diphenylmethane diisocyanate, perhydro-4,4'-diphenylmethane diisocyanate ($H_{12}MDI$), 4,4'-diisocyanato-3,3',5,5'-tetramethyldicyclohexylmethane, 4,4'-diisocyanato-2,2',3,3',5,5',6,6'-octamethyldi-cyclohexylmethane, ω,ω'-diisocyanato-1,4-diethylbenzene, 1,4-diisocyanatomethyl-2,3,5,6-tetramethylbenzene, 2-methyl-1,5-diisocyanatopentane (MPDI), 2-ethyl-1,4-diisocyanatobutane, 1,10-diisocyanatodecane, 1,5-diisocyanatohexane, 1,3-diisocyanatomethylcyclohexane, 1,4-diisocyanatomethylcyclohexane, tetamethylxylylene diisocyanate (TMXDI), 2,5(2,6)-bis(isocyanatomethyl)bicyclo[2.2.1]heptane (NBDI), and also any mixture of these compounds. Polyisocyanates of higher isocyanate functionality may also be used.

Examples of such a trimerized hexamethylene diisocyanate and trimerized isophorone diisocyanate.

Furthermore mixtures of polyisocyanates can also be utilized. The organic polyisocyanates suitable as crosslinking agents (A2) for the invention may also be prepolymers, deriving, for example, from a polyol, including a polyether polyol or a polyester polyol.

Utilized as blocked polyisocyanates may be any desired isocyanates wherein the isocyanate groups have been reacted with a compound, making the resultant blocked polyisocyanate particularly stable with respect to hydroxyl groups and amino groups such as primary and/or secondary amino groups at room temperature, in other words at a temperature of 18 to 23° C., but reacting at elevated temperatures, as for example at 80° C., more preferably ≥110° C., very preferably 130° C., and especially preferably ≥140° C., or at 90° C. to 300° C., or at 100 to 250° C., more preferably still at 125 to 250° C., and very preferably at 150 to 250° C. For the blocking of the isocyanates it is possible with preference to use any desired suitable aliphatic, cycloaliphatic, or aromatic alkyl monoalcohols. Examples thereof are aliphatic alcohols, such as methyl, ethyl, chloroethyl, propyl, butyl, amyl, hexyl, heptyl, octyl, nonyl, 3,3,5-trimethylhexyl, decyl, and lauryl alcohol; cycloaliphatic alcohols, such as cyclopentanol and cyclohexanol; and aromatic alkyl alcohols, such as phenylcarbinol and methylphenylcarbinol. Other suitable blocking agents are hydroxylamines, such as ethanolamine, oximes, such as methyl ethyl ketone oxime, acetone oxime, and cyclohexanone oxime, and amines, such as dibutylamine and diisopropylamine.

The aqueous coating composition of the invention comprises preferably as crosslinking agent (A2) at least one optionally alkylated melamine-formaldehyde condensation products, preferably at least one water-soluble or dispersible melamine-formaldehyde condensation product, more particularly at least one water-soluble or -dispersible etherified (alkylated), preferably methylated, melamine-formaldehyde condensation product. Such products are available commercially, as under the Resimene® HM 2608 name, for example.

The crosslinking agent (A2) is preferably a crosslinking agent in dispersion or solution in water.

To accelerate the crosslinking it is possible for suitable catalysts to be added to the aqueous coating composition. The skilled person also knows of such catalysts.

The aqueous coating composition of the invention comprises the polymeric resin (A1) preferably in an amount in a range from 5 to 40 wt % or from 20 to 40 wt %, more preferably from 5 to 35 wt % or from 20 to 35 wt %, very preferably from 5 to 30 wt % or from 20 to 30 wt %, based in each case on the total weight of the aqueous coating composition.

The aqueous coating composition preferably comprises the crosslinking agent (A2) in an amount from 5 to 40 wt %, preferably in an amount from 10 to 35 wt %, more preferably in an amount from 15 to 30 wt %, based on the total weight of the polymeric resins (A1) in the coating composition. These quantity figures are based in each case on the respective solids content.

The aqueous coating composition preferably comprises the crosslinking agent (A2) in an amount from 0.1 to 20 wt %, preferably in an amount from 0.5 to 15 wt %, more preferably in an amount from 1 to 10 wt %, based in each case on the total weight of the aqueous coating composition.

Pigment (B) The coating composition of the invention comprises at least one pigment (B).

The pigment (B) is preferably in the form of a pigment (B) in dispersion or solution in water.

Particularly suitable as pigment (B) are organic and/or inorganic, coloring and/or extending pigments, and more particularly pigments which have preferably at least two of these properties.

In one preferred embodiment, the pigment (B) is an effect pigment or a mixture of at least one effect pigment and at least one pigment different therefrom which is not itself an effect pigment and which is selected preferably from the group consisting of organic and inorganic, coloring and extending pigments and also pigments which have preferably at least two of these properties.

A skilled person is familiar with the concept of effect pigments. A corresponding definition is found in, for example, Römpp Lexikon Lacke und Druckfarben, Georg Thieme Verlag, 1998. Effect pigments are preferably pigments which impart optical effect or color and optical effect, more particularly optical effect. A corresponding classification of the pigments is made according to DIN 55945 (Date: December 2011).

The pigment (B) is preferably selected from the group consisting of optionally coated organic and inorganic effect pigments.

More preferably the pigment (B) is selected from the group consisting of optionally coated metallic effect pigments, optionally coated metal oxide effect pigments, optionally coated effect pigments composed of metals and nonmetals, and optionally coated nonmetallic effect pigments.

Very preferably indeed the pigment (B) is selected from the group consisting of metallic effect pigments, silicate-coated metallic effect pigments, and optionally coated nonmetallic effect pigments such as pearlescent pigments, more particularly mica pigments. With more particular preference the pigment (B) is selected from the group consisting of metallic effect pigments and silicate-coated metallic effect pigments.

Examples of preferred metallic effect pigments are aluminum effect pigments, iron effect pigments, or copper effect pigments. Especially preferred are optionally coated—such as, for example, silanized and/or chromated—aluminum effect pigments, more particularly commercially available products from Eckart such as Stapa® Hydrolac, Stapa® Hydroxal, Stapa® Hydrolux and Stapa® Hydrolan, most preferably Stapa® Hydrolux and Stapa® Hydrolan.

The effect pigments (B) used in accordance with the invention may be in any customary form known to the skilled person, such as a leaflet form and/or a platelet form, for example, more particularly a (corn)flake form or a silver dollar form.

Examples of effect pigments composed of metals and nonmetals are aluminum pigments coated with iron oxide, as described in European patent application EP 0 562 329 A2, for example, glass leaflets coated with metals, more particularly with aluminum, or interference pigments which include a reflector layer made of metal, more particularly aluminum.

Examples of nonmetallic effect pigments are pearlescent pigments, more particularly mica pigments, graphite pigments which are coated with metal oxides and have a platelet form, for example, interference pigments which do not include a metal reflector layer and which exhibit a strong color flop, effect pigments based on iron oxide, or organic, liquid-crystalline effect pigments.

For further details regarding the effect pigments employed preferably in accordance with the invention as pigment (B), refer to Römpp Lexikon Lacke und Druckfarben, Georg Thieme Verlag, 1998, page 176, "Effect pigments" and pages 380 and 381, "Metal oxide-mica pigments" to "Metal pigments".

Pigments suitable as pigment (B) that are not effect pigments are preferably selected from the group consisting of organic and inorganic, coloring and extending pigments, pigments which have preferably at least two of these properties, and nanoparticles.

Examples of suitable inorganic coloring pigments are white pigments such as titanium dioxide, zinc white, zinc sulfide or lithopone; black pigments such as carbon black, iron manganese black, or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate. Examples of suitable organic coloring pigments are monoazo pigments, disazo pigments, anthraquinone pigments, benzimidazole pigments, quinoacridone pigments, quinophthalone pigments, diketopyrrolopyrrol pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black. Examples of suitable extending pigments or fillers are chalk, calcium sulfate, barium sulfate, silicates such as talc or kaolin, silicas, oxides such as aluminum hydroxide or magnesium hydroxide, or organic fillers such as textile fibers, cellulose fibers, polyethylene fibers, or polymer powders; for further details, refer to Römpp Lexikon Lacke und Druckfarben, Georg Thieme Verlag, 1998, pages 250 ff., "Fillers". The nanoparticles are preferably selected from the group consisting of main and transition group metals and their compounds. The main and transition group metals are preferably selected from metals from main groups three to five, from transition groups three to six and also one and two, of the Periodic Table of the Elements, and also from the lanthanides.

Particularly preferred for use are boron, aluminum, gallium, silicon, germanium, tin, arsenic, antimony, silver, zinc, titanium, zirconium, hafnium, vanadium, niobium, tantalum, molybdenum, tungsten, and cerium, more particularly aluminum, silicon, silver, cerium, titanium, and zirconium. The compounds of the metals are preferably the oxides, oxide hydrates, sulfates, or phosphates. Preference is given to using silver, silicon dioxide, aluminum oxide, aluminum oxide hydrate, titanium dioxide, zirconium oxide, cerium oxide, and mixtures thereof, more preferably silver, cerium oxide, silicon dioxide, aluminum oxide hydrate and mixtures thereof, very preferably aluminum oxide hydrate, and more particularly boehmite. These nanoparticles preferably have an average primary particle size <50 nm, more preferably 5 to 50 nm, especially 10 to 30 nm. The primary particle size here is determined preferably by means of laser diffraction, more preferably by means of laser granulometry in accordance with ISO 13320-1 (Date: September 2009).

The amount of the inventively employed pigment (B) in the coating composition of the invention may vary very widely according to the inventive use of the pigmented coating composition in question. The amount of pigment (B), based on the coating composition of the invention, is preferably 0.1 to 25 wt %, more preferably 1.0 to 20 wt %, very preferably 1.5 to 18 wt %, especially preferably 2 to 15 wt %, and more particularly 2.0 to 8 wt %.

Dispersion (P) as a Constituent of the Coating Composition of the Invention

All preferred embodiments described hereinabove in connection with the aqueous dispersion (P) of the invention are also preferred embodiments in relation to the coating composition of the invention comprising the aqueous dispersion (P) of the invention, particularly in connection with the polymeric resins (P1) and (P2).

The coating composition of the invention is preferably obtainable by steps (1) and (2), which succeed one another in this order, namely
  (1) preparing the aqueous dispersion (P) of the invention, and
  (2) mixing the aqueous dispersion (P) obtained by step (1) with the other components used in preparing the coating composition, i.e., at least with components (A1) and (B) and also, optionally, (A2), (D), (E), further water and/or organic solvent.

The aqueous dispersion (P) is therefore preferably prepared beforehand by dispersing the polymeric resin (P1) in water or in an aqueous medium in the presence of the polymeric resin (P2). This aqueous dispersion (P) thus prepared is used as a component for preparing the coating composition of the invention. As observed above, moreover, the aqueous dispersion (P) may optionally include at least one component (C).

The at least one polymeric resin (P1) and the at least one polymeric resin (P2) different therefrom are preferably present in the coating composition of the invention together in an amount in a range from 0.5 to 15 wt %, more preferably from 0.75 to 10 wt %, very preferably from 1.0 to 8.5 wt %, especially preferably from 1.5 to 7.5 wt %, most preferably from 1.0 to 5.0 wt %, based in each case on the total weight of the coating composition.

The coating composition of the invention comprises the polyamide, used within the dispersion (P) as polymeric resin (P1), preferably in an amount in a range from 0.05 to 5 wt %, more preferably in an amount in a range from 0.1 to 4.5 wt %, very preferably in an amount in a range from 0.15 to 4 wt %, more preferably still in an amount in a range from 0.2 to 3.5 wt %, more particularly in an amount in a range from 0.25 to 3 wt %, based in each case on the total weight of the coating composition. The amount of the polyamide in wt % in the basecoat composition of the invention refers in each case to the polyamide per se, i.e., to its solids content.

The coating composition of the invention comprises the polyester, used within the dispersion (P) as polymeric resin (P2), preferably in an amount in a range from 0.4 to 10 wt %, more preferably in an amount in a range from 0.6 to 9 wt %, very preferably in an amount in a range from 0.8 to 8 wt %, more preferably still in an amount in a range from 1 to 6 wt %, more particularly in an amount in a range from 1.5 to 5 wt %, based in each case on the total weight of the coating composition. The amount of the polyester in wt % in the basecoat composition of the invention refers in each case to the polyester per se, i.e., to its solids content.

Optional Component (D) of the Inventive Coating Composition

The coating composition of the invention may optionally comprise at least one further component (D). Component (D) is suitably and preferably a thickener, preferably a thickener which is different from the polymeric resin (P1). Moreover, the optional component (D) is also different from the polymeric resin (P2). Two or more components (D) different from one another may also be used. The optional component (D) is preferably selected from the group consisting of metal silicates, thickeners based on poly(meth)acrylic acid, thickeners based on polyurethanes, polymeric waxes, and mixtures thereof.

The metal silicate is selected preferably from the group of the smectites. With particular preference the smectites are selected from the group of montmorillonites and hectorites. The montmorillonites and hectorites are selected more particularly from the group consisting of aluminum magnesium silicates and also sodium magnesium and sodium magnesium fluorine lithium phyllosilicates. These inorganic phyllosilicates are sold under the brand name Laponite®.

Thickeners based on poly(meth)acrylic acid are optionally crosslinked and/or neutralized with a suitable base. Examples of such thickeners based on poly(meth)acrylic acid are "Alkali Swellable Emulsions" (ASE), and hydrophobically modified variants of these, the "Hydrophilically modified Alkali Swellable Emulsions" (HASE). Thickeners based on poly(meth)acrylic acid are preferably anionic. Corresponding products such as Rheovis® AS 1130 are available commercially.

Thickeners based on polyurethanes (e.g. polyurethane associative thickeners) are optionally crosslinked and/or neutralized with a suitable base. Corresponding products such as Rheovis® PU 1250 are available commercially.

Examples of suitable polymeric waxes include optionally modified polymeric waxes based on ethylene-vinyl acetate copolymers. Corresponding products are available commercially, for example, under the Aquatix® name.

Where the coating composition of the invention includes at least one component (D), the relative weight ratio of the polymeric resin (P1) in the coating composition of the invention to the further component (D) is preferably in a range from 15:1 to 1:15, more preferably in a range from 5:1 to 1:5, very preferably in a range from 5:1 to 1.5:1. All figures are based on the solids content of the components.

Where component (D) is a metal silicate, the relative weight ratio of the polymeric resin (P1) in the coating composition of the invention to component (D) is preferably in a range from 7.5:1 to 1.2:1, more preferably in a range from 5:1 to 1.5:1. Where component (D) is a thickener based on poly(meth)acrylic acid, the relative weight ratio of the polymeric resin (P1) in the coating composition of the invention to component (D) is preferably in a range from 5:1 to 1.5:1, more preferably in a range from 4:1 to 2:1. Where component (D) is a thickener based on polyurethanes, the relative weight ratio of the polymeric resin (P1) in the coating composition of the invention to component (D) is preferably in a range from 4:1 to 1.2:1, more preferably in a range from 3:1 to 1.5:1. All figures are based on the solids content of the components.

The at least one component (D) is preferably present in the coating composition of the invention in an amount of at most 5 wt %, more preferably of at most 2.5 wt %, very preferably at most 1.5 wt %, more particularly at most 1.0 wt %, most preferably at most 0.75 wt %, based in each case on the total weight of the coating composition.

Optional component (E) The coating composition of the invention, depending on its desired application, may comprise one or more customary employed additives as component (E). These additives (E) are preferably selected from the group consisting of antioxidants, antistats, wetting agents, dispersants, flow control assistants, solubilizers, defoaming agents, wetting agents, stabilizing agents, preferably heat stabilizers and/or thermal stabilizers, in-process stabilizers, and UV and/or light stabilizers, photoprotectants, deaerating agents, inhibitors, catalysts, flexibilizing agents, flame retardants, reactive diluents, carrier media, hydrophobizing agents, hydrophilizing agents, impact modifiers, expandants, process auxiliaries, plasticizers, and mixtures of the aforementioned further additives. The amount of additive (E) in the coating composition of the invention may vary. The amount, based on the total weight of the coating composition of the invention, is preferably 0.01 to 20.0 wt %, more preferably 0.05 to 18.0 wt %, very preferably 0.1 to 16.0 wt %, especially preferably 0.1 to 14.0 wt %, more particularly 0.1 to 12.0 wt %, and most preferably 0.1 to 10.0 wt %.

The coating composition of the invention may be prepared by dispersing and/or dissolving the respective components described above in a water-based medium, with mixing by means of high-feed stirrers, stirred tanks, agitator mills, dissolvers, kneading devices, or inline dissolvers, for example, optionally with further addition of water.

Use

A further subject of the present invention is a use of the coating composition of the invention for at least partly coating an optionally coated substrate with a basecoat film.

Examples of suitable substrates include articles made of metal or plastic that are to be coated, such as bodies and parts thereof, produced therefrom, of motor vehicles such as automobiles, trucks, motorcycles, and buses, and parts of electrical household appliances, produced from metal or plastic.

Method, basecoat film, and substrate A further subject of the present invention is a method for at least partly coating an optionally coated substrate with a basecoat film, comprising at least one step (a):

(a) at least partly coating at least one optionally coated substrate with a basecoat film with the aqueous coating composition of the invention.

Step (a) here takes place by at least partial contacting of the substrate with the coating composition of the invention.

Step (a) may optionally be followed by a further step (b), this being the application of a further coating film, preferably a clearcoat film, to the basecoat film applied by step (a). In that case the method of the invention is a method for producing a multicoat paint system.

A further subject of the present invention is a basecoat film which is obtainable by at least partial coating of at least one optionally coated substrate with the aqueous coating composition of the invention, or which is obtainable by the method of the invention.

A further subject of the present invention is a substrate coated at least partially with the aqueous coating composition of the invention or with the basecoat film of the invention.

The coating composition of the invention may be applied here directly or after the preceding at least partial application of a primer coating composition (primer), and, where necessary, after the at least partial application of a further coating composition such as a surfacer film to the primer, to the articles that are to be coated. This is followed preferably by curing of these coating films. The coating composition of the invention is applied preferably as a paint system to automotive bodies and parts thereof. The metallic articles to be coated are preferably subjected beforehand to chemical treatment with phosphates and chromates, preferably phosphates such as metal phosphates, more particularly zinc phosphates.

The coating composition of the invention may be coated onto these target substrates by electrostatic coating, by air spray coating, and by airless spray coating. The thickness of the resultant coating film thereof is preferably in a range from 5 to 35 μm, more particularly 10 to 25 μm, as cured coating film. The coating film may be dried, for example, by heating for 2 to 40 minutes, preferably 5 to 20 minutes, at 50 to about 100° C. (oven temperature).

A clear coating composition may be coated onto the coating film of the coating composition of the invention, after it has cured or without its being cured, i.e., onto a coated side thereof.

The clear coating composition for the application of a clearcoat of this kind may be applied by first coating the coating composition of the invention onto the target substrate in the manner described above, and by coating the clear coating composition, with a solids content in the coating composition controlled at preferably 30 to 80 wt %, onto a coated surface of said substrate, by means of electrostatic coating, air spray coating, and airless spray coating, after the curing of a coating film thereof by heating, or in an uncured state. The film thickness of the clear coating composition is preferably in a range of commonly 5 to 100 μm, more particularly 20 to 80 μm, based on the cured coating film. The entire coating film may be cured by heating for 10 to 40 minutes at 100 to 180° C.

Methods of Determination

1. Assessing the Incidence of Bits on Application of the Inventive Aqueous Dispersions or Comparative Dispersions to a Substrate To assess the incidence of bits, the dispersions are investigated by the following general protocol:

The respective dispersion is applied using a 150 μm four-way bar applicator to a glass panel measuring 9 cm by 15 cm. In the wet state, the film thus formed, after a 60-minute flashing time at 18 to 23° C., is assessed visually for the incidence of bits, by holding it against a light source, so as not to misinterpret any air inclusions as bits. A rating of 1-5 is awarded (1=no bits/5=very many bits).

2. Assessing Homogeneity and Water-Miscibility

To assess the homogeneity and water-miscibility, the inventive aqueous dispersions (or comparative dispersions) are investigated by the following general protocol:

a) Homogeneity: An assessment is made of whether the individual components used to prepare the dispersion can be combined to form a macroscopically single-phase mixture (homogeneous mixture) or whether, for example, two or more phases are formed as a result of separation as early, for example, as during the weighing-out procedure, for example, or within 5 to 10 minutes after the components have been stirred together.

b) Water-miscibility: An assessment is made of the extent to which deionized water, as the last component used in preparing the dispersion, can be mixed with the other constituents of the dispersion. One measure of this, in particular, is the amount of shearing energy needed in the mixing operation.

In each case, ratings of 1-5 are awarded (1=very homogeneous/5=very inhomogeneous and 1=very good water-miscibility/5=water-immiscible).

3. Assessing the Storage Stability of the Inventive Aqueous Dispersions or Comparative Dispersions To assess the storage stability, the inventive aqueous dispersions (or comparative dispersions) are investigated visually by the following general protocol:

The respective dispersion is stored in a sealed glass vessel at 18-23° C. or at 40° C. over a period of 28 or 365 days. This storage period is followed by an inspection to determine whether separation has taken place. A rating of 1-5 is awarded (1=very stable, i.e., no separation and no formation of two or more phases/5=very unstable, i.e., severe separation and/or very marked formation of two or more phases).

4. Assessing Incidence of Pinholes

To assess the incidence of pinholes, an inventive coating composition comprising the inventive aqueous dispersion (or a comparative coating composition) is applied as waterborne basecoat material to a steel panel coated with a primer-surfacer system and measuring 32 by 60 cm, by means of single application. Beforehand, the steel panel is provided at one long edge with two adhesive strips (Tesaband, 19 mm), in order to allow differences in film thickness to be determined after coating has taken place. The waterborne basecoat material is then applied electrostatically with a dry film thickness of 16-19 µm. The resulting waterborne basecoat film, after a flashing time at room temperature (18 to 23° C.) of 5 minutes, is subsequently dried in a forced air oven at 80° C. for 10 minutes. Following removal of one of the two adhesive strips, a gravity-feed spray gun is used manually to apply a commercial two-component clearcoat material (Evergloss® from BASF Coatings GmbH) to the dried waterborne basecoat film, in a wedge format with a dry film thickness of 0-55 µm. The resulting clearcoat film is flashed at room temperature (18 to 23° C.) for 10 minutes; this is followed by curing in a forced air oven at 140° C. for a further 20 minutes. Following removal of the second adhesive strip, the dry film thickness of the waterborne basecoat is checked, and for the clearcoat wedge the film thickness ranges 20-30 µm, 30-40 µm and 40-50 µm are marked on the steel panel. The respective film thicknesses are determined here in accordance with DIN EN ISO 2808 (date: May 2007), method 12A (e.g., with the mini test 3100-4100 instrument from ElektroPhysik).

The pinholes are evaluated visually in the three separate clearcoat dry coat thickness ranges (20-30 µm, 30-40 µm and 40-50 µm). The number of pinholes in each region is counted. All results are standardized to an area of 200 cm². Additionally, where appropriate, a record is kept of the clearcoat dry film thickness above which pinholes no longer occur.

5. Determining Storage Stability of Inventive or Comparative Coating Compositions The storage stability of the inventive coating compositions comprising an inventive aqueous dispersion (or of comparative coating compositions) is determined by investigating them before and after two-week storage at 40° C., using a rotary viscometer corresponding to DIN 53019-1 (Date: September 2008) and in accordance with DIN 53019-2 (Date: February 2001) under controlled conditions (23.0° C.±0.2° C.). The samples are first subjected to primary shearing for 3 minutes at a rate of 100 s$^{-1}$. This is followed by conditioning without a shearing load. For the measurement of a flow curve, a shear rate range from 0.1 s$^{-1}$ to 1000 s$^{-1}$ is traveled within about 5 minutes (upward curve). Thereafter, shearing is maintained at 1000 s$^{-1}$ for a minute (holding time), before it is subsequently run down again over approximately 5 minutes in a shear rate range from 1000 s$^{-1}$ to 0.1 s$^{-1}$ (downward curve). 36 measurement points are captured during the upward and downward curves, and 10 measurement points during the holding time. The average viscosity level during the holding time (high-shear viscosity) and the viscosity level at 1 s$^{-1}$ (low-shear viscosity), determined from the downward curve, are determined from the measurement data, and the values before and after storage are compared with one another.

6. Assessing the Incidence of Bits on Application of the Inventive Coating Compositions or Comparative Coating Compositions to a Substrate For assessing the incidence of bits, an inventive coating composition comprising an inventive aqueous dispersion (or a comparative coating composition) is applied as waterborne basecoat material to a steel panel, coated with a surfacer coating and measuring 32 by 60 cm, by means of dual application, with application in the first step taking place electrostatically with a dry film thickness of 8-9 µm, and application in the second step taking place pneumatically, after a 2-minute flashing time at room temperature (18 to 23° C.), with a dry film thickness of 4-5 µm. Subsequently, after a further flashing time of 5 minutes at room temperature, the resulting waterborne basecoat film is dried in a forced air oven at 80° C. for 5 minutes. Applied atop the dried waterborne basecoat film is a commercial two-component clearcoat material (ProGloss® from BASF Coatings GmbH), with a dry film thickness of 40-45 µm. The resulting clearcoat film is flashed at room temperature (18 to 23° C.) over a time of 10 minutes. This is followed by curing in a forced air oven at 140° C. for a further 20 minutes.

Bits are evaluated visually, with a rating of 1-5 being awarded (1=no bits/5=very many bits).

7. Determining the Nonvolatile Fraction

The nonvolatile fraction is determined in accordance with DIN EN ISO 3251 (date: June 2008). This determination is accomplished by weighing out 1 g of sample into an aluminum dish dried beforehand and carrying out drying in a drying oven at 125° C. for 60 minutes, followed by cooling in a desiccator, and then by reweighing. The residue, relative to the total amount of the sample employed, corresponds to the nonvolatile fraction. The volume of the nonvolatile fraction may be determined, if necessary, in accordance optionally with DIN 53219 (Date: August 2009)

8. Determining the Number-Average and Weight-Average Molecular Weights

The number-average molecular weight ($M_n$) is determined by means of gel permeation chromatography (GPC). The method of determination is along the lines of DIN 55672-1 (Date: August 2007). Besides the number-average molecular weight, this method may also be used to determine the weight-average molecular weight ($M_w$) and also the polydispersity (ratio of weight-average molecular weight ($M_w$) to number-average molecular weight ($M_n$)). Tetrahydrofuran is used as eluent. The determination is made against polystyrene standards. The column material consists of styrene-divinylbenzene copolymers.

9. Determining the Hydroxyl Number (OH Number)

The OH number was determined in accordance with DIN 53240-2 (date: November 2007). In this method, the OH groups are reacted by acetylation with an excess of acetic anhydride. The excess acetic anhydride is subsequently cleaved by addition of water to form acetic acid, and the entire acetic acid is back-titrated with ethanolic KOH. The OH number indicates the amount of KOH in mg which is equivalent to the amount of acetic acid bound in the acetylation of 1 g of sample.

10. Determining the Acid Number

The acid number is determined in accordance with DIN EN ISO 2114 (date: June 2002), using "method A". The acid number corresponds to the mass of potassium hydroxide in mg which is needed to neutralize 1 g of sample under the conditions specified in DIN EN ISO 2114.

11. Determining the Cloudiness

The cloudiness of a coating is understood according to DIN EN ISO 4618 (Date: March 2007) to refer to the nonuniform appearance of a coating, caused by irregular regions, distributed randomly over the surface, which differ in color and/or gloss. A patchwork inhomogeneity of this kind disrupts the overall visual impression of the coating and it is generally unwanted. The unwanted cloudiness of the coating may be caused, for example, by the properties of the coating composition employed.

To determine and assess the cloudiness, multicoat paint systems are produced by the following general protocol:

A steel panel measuring 32 cm by 60 cm and coated with a standard surfacer coating (SecuBloc® from BASF Coatings GmbH) is applied by means of dual application with an inventive coating composition or a comparative coating composition as waterborne basecoat material: application in the first step takes place electrostatically to a target film thickness (dry film thickness) of 8-9 µm, and in the second step, after a two-minute flashing time at 18-23° C., it takes place pneumatically to a target film thickness of 4-5 µm (dry film thickness). The resulting waterborne basecoat film, after a further flashing time at 18-23° C. over a duration of 5 minutes, is subsequently dried in a forced air oven at 80° C. for 5 minutes. Applied atop the dried waterborne basecoat film is a commercial two-component clearcoat material (ProGloss® from BASF Coatings GmbH), to a target film thickness (dry film thickness) of 40-45 µm. The resulting clearcoat film is flashed off at 18-23° C. for 10 minutes. This is followed by curing in a forced air oven at 140° C. for 20 minutes.

The cloudiness is assessed visually under defined light conditions and observation geometries. The cloudiness here is evaluated using a scale of ratings (rating 1=no perceptible cloudiness, to rating 5=severe cloudiness visible). For this purpose, the corresponding coatings are looked at under diffuse light at two different angles from a distance of 2 to 3 meters (a) straight-on viewing: viewing angle is about 80°, and (b) oblique viewing: viewing angle is about 40°).

The inventive and comparative examples below serve to illustrate the invention, but should not be interpreted as imposing any restriction.

INVENTIVE AND COMPARATIVE EXAMPLES

Unless indicated otherwise, the amounts in parts are parts by weight, and the amounts in percent are percentages by weight, in each case.

1. Components Used

The components identified below and used for preparing the dispersions and coating compositions of the invention and also corresponding comparative dispersions or comparative coating compositions have the following meanings:

Disparlon® A6900-20X is a commercially available polyamide from Kusumoto Chemicals, Ltd (nonvolatile fraction: 20 wt %).

Disparlon® A650-20X is a commercially available polyamide from Kusumoto Chemicals, Ltd (nonvolatile fraction: 20 wt %).

Disparlon® A670-20M is a commercially available polyamide from Kusumoto Chemicals, Ltd. (nonvolatile fraction: 20 wt %).

Disparlon® F-9030 is a commercially available polyamide from Kusumoto Chemicals, Ltd. (nonvolatile fraction: 20 wt %).

Thixatrol® P220X-MF is a commercially available polyamide from Elementis Specialties, Inc. (nonvolatile fraction: 20 wt %, acid number: 5 mg KOH/g).

Luvotix® PA 20 XA is a commercially available polyamide from Lehmann & Voss & Co. (nonvolatile fraction: 20 wt %, acid number: 7 mg KOH/g).

Luvotix® AB is a commercially available polyamide from Lehmann & Voss & Co. (nonvolatile fraction: 100 wt %; acid number: 3 mg KOH/g).

Troythix® 250 XF is a commercially available polyamide from Troy Corp., USA (nonvolatile fraction: 20 wt %; acid number: 4-5 mg KOH/g).

The inventively employed aqueous dispersion of a polyester (I) is prepared as described in example D of DE 40 09 858 A1 (column 16, lines 37-59), but with the difference that butyl glycol is used for dilution instead of butanol, the dispersion having a nonvolatile fraction of 60 wt %. The polyester has an acid number of 30 mg of KOH/g polyester.

Polyester A (inventively employed polyester) is prepared by weighing out and melting, in a reactor equipped with a stirrer, a thermometer, and a packed column, 6.13 parts by weight of neopentyl glycol, 3.23 parts by weight of 1,6-hexanediol, 7.78 parts by weight of hexahydrophthalic anhydride, and 29.17 parts by weight of a polymeric fatty acid (dimer content at least 98 wt %, trimer content at most 2 wt %, monomer content at most traces) and also 11.07 parts by weight of the commercially available product Bisphenol A 4EO. These constituents are heated, with stirring, in a manner such that the column overhead temperature does not exceed 95° C. Esterification is continued at not more than 220° C. until an acid number of 8.5 mg KOH/g has been reached. After cooling has taken place to 100° C., 3.33 parts by weight of trimellitic anhydride are added, and esterification is continued at not more than 160° C. until an acid number of 30-35 mg KOH/g has been reached. After cooling to 90° C. has taken place, 2.8 parts by weight of dimethylethanol amine, 17.28 parts by weight of deionized water, and 19.21 parts by weight of butyl glycol are incorporated slowly with stirring. The product is a finely divided dispersion having a pH of 7.3-8.5, a nonvolatile fraction of 60 wt %, an acid number of 35.3 mg KOH/g, and an OH number of 54 mg KOH/g. This dispersion is used as it is as polyester A.

Polyester B (inventively employed polyester) is prepared by weighing out and melting, in a reactor equipped with a stirrer, a thermometer, and a packed column, 6.87 parts by weight of neopentyl glycol, 7.23 parts by weight of 1,6-hexanediol, 5.81 parts by weight of hexahydrophthalic anhydride, and 32.66 parts by weight of a polymeric fatty acid (dimer content at least 98 wt %, trimer content at most 2 wt %, monomer content at most traces) and also 5.03 parts by weight of dodecenylsuccinic anhydride. These constituents are heated, with stirring, in a manner such that the column overhead temperature does not exceed 95° C. Esterification is continued at not more than 220° C. until an acid number of 8.5 mg KOH/g has been reached. After cooling has taken place to 100° C., 3.31 parts by weight of trimellitic anhydride are added, and esterification is continued at not more than 160° C. until an acid number of 30-35 mg KOH/g has been reached. After cooling to 90° C. has taken place, 2.78 parts by weight of dimethylethanol amine, 17.19 parts by weight of deionized water, and 19.12 parts by weight of butyl glycol are incorporated slowly with stirring.

The product is a finely divided dispersion having a pH of 7.3-8.5, a nonvolatile fraction of 60 wt %, an acid number of 35.5 mg KOH/g, and an OH number of 56 mg KOH/g. This dispersion is used as it is as polyester B.

Polyester C (noninventively employed polyester) is prepared by introducing maleic anhydride (MAn, 2.48 mol), adipic acid (AD, 2.72 mol), and 1,6-hexanediol (HD, 7.01 mol) into a 4-liter reactor made from stainless steel and equipped with a column, a condenser, and a water separator. Subsequently, 3% of xylene was added as an entrainer, and 0.1% of methylhydroquinone (the percentage figures are based on the amount of MAn, AD and HD used). The resulting reaction mixture was heated under lean air over the course of 5 hours. Throughout the reaction time, the temperature of the reaction mixture does not exceed 230° C. When an acid number of 2 mg KOH/g, based on the oligoester, was reached the reaction mixture was cooled to 80° C. This was followed by the addition in situ of trimelletic anhydride (TMAn, 0.95 mol). Thereafter, heating took place slowly to 160° C., and this temperature was maintained until an acid number of 35 mg KOH/g, based on the resulting oligoester, was reached. After cooling to 80° C. had again taken place, dimethylethanolamine (DMEA, 0.77 mol) was added over a period of 30 minutes. This was followed by the addition of water to set a solids content of 25 wt %, over a period of 30 minutes. The resulting dispersion was stirred for a further hour at 80° C. and then cooled to 18-23° C. This dispersion is used as it is as polyester C. The alpha,omega-hydroxy-functionalized oligoester present in the dispersion has an OH number of 58 mg KOH/g, an acid number of 35 mg KOH/g, a number-average molecular weight of 3618 g/mol, and a weight-average molecular weight of 25 400 g/mol.

Resimene® HM 2608 is a commercially available melamine-formaldehyde resin from Ineos (nonvolatile fraction: 80-85 wt %).

Lipotin® A is a commercially available wetting and dispersing agent from Evonik Industries AG.

Lutensol® ON 60 and Lutensol® XP 70 are commercially available nonionic surface additives from BASF SE.

The soya lecithin used is a liquid product available commercially from Hanf & Nelles.

Alu Stapa Hydrolux® VP56450 is a commercially available aluminum pigment available from Altana-Eckart.

Rheovis® AS 1130 is a commercially available aqueous solution from BASF SE, containing 30 wt % of thickener based on an acrylic copolymer.

Pluriol® E300 is a commercially available polyethylene glycol from BASF SE.

Dispex® Ultra FA 4437 is a commercially available flow control assistant available from BASF SE.

Disparlon® AQ600 is a commercially available polyamide from Kusumoto Chemicals, Ltd (nonvolatile fraction: 20 wt %).

Disparlon® AQ630 is a commercially available polyamide from Kusumoto Chemicals, Ltd (nonvolatile fraction: 18 wt %).

The aqueous dispersion of at least one polymeric resin (I) is prepared as described on page 7, line 55 to page 8, line 23 of DE 44 37 535 A1.

The aqueous dispersion of at least one polymeric resin (II) is a dispersion of a poly(meth)acrylate resin having a nonvolatile fraction of 26-28 wt %.

2. Preparation of Inventive Aqueous Dispersions of Thickeners and of Corresponding Comparative Dispersions (Noninventive Dispersions)

2.1 Preparation of Noninventive Comparative Dispersions of Thickeners V1 to V14:

Introduced initially is at least one organic solvent and also optionally at least one neutralizing agent such as, for example, 2,4,7,9-tetramethyl-5-decynediol. Added with stirring to the resulting mixture, at a temperature of 15-25° C., is at least one of the aforementioned commercially available polyamides. Added to this mixture in succession or simultaneously and with stirring is an aqueous dispersion of a polyester (I) and deionized water. The resulting mixture is subsequently homogenized with stirring over a period of 10 minutes at the aforementioned temperature, by means of the Dispermat® LC30 instrument from VWA-Getzmann, Germany, at a peripheral speed of the stirring disk used of 15 to 20 m/s.

In this way, from the components listed in tables 1.1 and 1.2 below, the noninventive dispersions of thickeners V1 to V14 are obtained. The amounts figures in each case are in wt %, based on the total weight of the respective dispersion:

TABLE 1.1

Preparation of dispersions of the noninventive thickeners V1 to V9

| Components | V1 | V2 | V3 | V4 | V5 | V6 | V7 | V8 | V9 |
|---|---|---|---|---|---|---|---|---|---|
| Isobutanol | 20.0 | 20.0 | 20.0 | 20.0 | 20.0 | 20.0 | 20.0 | 20.0 | 20.0 |
| Dimethylethanolamine | 2.0 | 2.0 | 2.0 | 2.0 | 1.0 | 1.0 | 1.0 | — | 0.3 |
| 2,4,7,9-tetramethyl-5-decynediol in butyl glycol (52 wt %) | 3.0 | 3.0 | 3.0 | 3.0 | 3.0 | 3.0 | 3.0 | 3.0 | 3.0 |

TABLE 1.1-continued

Preparation of dispersions of the noninventive thickeners V1 to V9

| Components | V1 | V2 | V3 | V4 | V5 | V6 | V7 | V8 | V9 |
|---|---|---|---|---|---|---|---|---|---|
| Disparlon ® 6900-20X | 10.0 | — | — | — | — | — | — | — | — |
| Disparlon ® A650-20X | — | 10.0 | — | — | 10.0 | — | — | — | — |
| Disparlon ® A670-20M | — | — | 10.0 | — | — | 10.0 | — | 10.0 | 10.0 |
| THIXATROL ® P220X - MF | — | — | — | 10.0 | — | — | 10.0 | — | — |
| Aqueous dispersion of a polyester (I) | 20.0 | 20.0 | 20.0 | 20.0 | 20.0 | 20.0 | 20.0 | 20.0 | 20.0 |
| Deionized water | 45.0 | 45.0 | 45.0 | 45.0 | 46.0 | 46.0 | 46.0 | 47.0 | 46.7 |
| Fraction of a polyamide (wt % solids) | 2% | 2% | 2% | 2% | 2% | 2% | 2% | 2% | 2% |
| Fraction of organic solvents (wt %) | 33.4% | 33.4% | 33.4% | 33.4% | 33.4% | 33.4% | 33.4% | 33.4% | 33.4% |

TABLE 1.2

Preparation of dispersions of the noninventive thickeners V10 to V14

| Components | V10 | V11 | V12 | V13 | V14 |
|---|---|---|---|---|---|
| Butyl glycol | 20.0 | 20.0 | 20.0 | 20.0 | 20.0 |
| Dimethylethanolamine | 0.3 | 0.3 | 0.3 | 0.3 | 0.3 |
| 2,4,7,9-tetramethyl-5-decynediol in butyl glycol (52 wt %) | 3.0 | 3.0 | 3.0 | 3.0 | 3.0 |
| THIXATROL ® P220X-MF | 10.0 | — | — | — | — |
| Disparlon ® 6900-20X | — | 10.0 | — | — | — |
| Disparlon ® A670-20M | — | — | 10.0 | — | — |
| Disparlon ®F-9030 | — | — | — | 10.0 | — |
| Luvotix ® PA 20 XA | — | — | — | — | 10.0 |
| Aqueous dispersion of a polyester (I) | 20.0 | 20.0 | 20.0 | 20.0 | 20.0 |
| Deionized water | 46.7 | 46.7 | 46.7 | 46.7 | 46.7 |
| Fraction of polyamide (wt % solids) | 2% | 2% | 2% | 3% | 2% |
| Fraction of organic solvents (wt %) | 33.4% | 33.4% | 33.4% | 32.4% | 33.4% |

The noninventive comparative dispersions V1 to V14 each have an organic solvent content of >32 wt %, based on the total weight of the respective dispersion. V1 to V9 are isobutanol-based and V10 to V14 are butyl glycol-based.

2.2 Preparation of Noninventive Comparative Dispersions of Thickeners V15 to V17:

The components listed in table 1.3 below are stirred together in the stated order with stirring at a temperature of 15-25° C. in each case to give a mixture. This mixture is subsequently homogenized with stirring for 10 minutes, in each case at the temperature stated above. The homogenization is carried out as described above in section 2.1.

TABLE 1.3

Preparation of dispersions of the noninventive thickeners V15 to V17

| Components | V15 | V16 | V17 |
|---|---|---|---|
| Resimene ® HM 2608 | 24.20 | 24.68 | 24.20 |
| Dimethylethanolamine | 0.32 | 0.57 | 0.32 |
| Disparlon ® A670-20M | 19.11 | — | 19.11 |
| Luvotix ® AB | — | 3.56 | — |
| n-Butoxypropanol | 10.51 | — | 10.51 |
| 1-Propoxy-2-propanol | 14.01 | — | 14.01 |
| Isobutanol | 15.29 | — | 15.29 |
| Butyl glycol | — | 37.97 | — |
| Aqueous dispersion of a polyester (I) | 16.56 | 33.22 | — |
| Fraction of polyamide (wt % solids) | 4% | 4% | 5% |
| Fraction of organic solvents (wt %) | 60.9% | 47.2% | 69.0% |

The noninventive comparative dispersions V15 to V17 each have an organic solvent content of >47 wt %, based on the total weight of the respective dispersion.

2.3 Preparation of Inventive Dispersions of Thickeners X1 to X7:

The components listed in table 1.4 below are stirred together in the stated order with stirring at a temperature of 15-25° C. in each case to give a mixture. This mixture is subsequently homogenized with stirring over a time of 10 minutes in each case at the temperature stated above. The homogenization is carried out as described above in section 2.1.

TABLE 1.4

Preparation of dispersions of inventive thickeners X1 to X7

| Components | X1 | X2 | X3 | X4 | X5 | X6 | X7 |
|---|---|---|---|---|---|---|---|
| Aqueous dispersion of a polyester (I) | 22.50 | 22.50 | 22.50 | 10.00 | 10.00 | — | — |
| Polyester A | — | — | — | — | — | 23.60 | — |
| Polyester B | — | — | — | — | — | — | 23.20 |

TABLE 1.4-continued

Preparation of dispersions of inventive thickeners X1 to X7

| Components | X1 | X2 | X3 | X4 | X5 | X6 | X7 |
|---|---|---|---|---|---|---|---|
| Dimethylethanolamine | 0.45 | 0.45 | 0.45 | 0.30 | 0.30 | 0.45 | 0.45 |
| 2,4,7,9-Tetramethyl-5-decynediol in butyl glycol (52 wt %) | 3.00 | 3.00 | 3.00 | — | — | 3.00 | 3.00 |
| Lipotin ® A | 3.00 | 3.00 | — | — | — | 3.00 | 3.00 |
| Soya lecithin | — | — | 3.00 | — | — | — | — |
| Lutensol ® ON 60 | — | — | — | 0.20 | — | — | — |
| Lutensol ® XP 70 | — | — | — | — | 0.20 | — | — |
| Deionized water | 56.05 | 56.05 | 56.05 | 69.50 | 69.50 | 54.95 | 55.35 |
| Disparlon ® A670-20M | 15.00 | — | 15.00 | 10.00 | 10.00 | 15.00 | 15.00 |
| Troythix ® 250XF | — | 15.00 | — | — | — | — | — |
| Butyl glycol | — | — | — | 10.00 | 10.00 | — | — |
| Fraction of polyamide (wt % solids) | 3% | 3% | 3% | 2% | 2% | 3% | 3% |
| Fraction of organic solvents (wt %) | 17.9% | 17.9% | 17.9% | 20.0% | 20.0% | 18.5% | 18.3% |

2.4 Preparation of an Inventive Dispersion of Thickener X8 and of a Noninventive Dispersion of a Thickener V18:

The components listed in table 1.5 below are stirred together in the stated order with stirring at a temperature of 15-25° C. in each case to give a mixture. This mixture is subsequently homogenized with stirring over a time of 10 minutes in each case at the temperature stated above. The homogenization is carried out as described above in section 2.1.

TABLE 1.5

Preparation of a dispersion of inventive thickener X8 and of a noninventive thickener V18

| Components | X8 | V18 |
|---|---|---|
| Aqueous dispersion of a polyester (I) | 10.0 | — |
| Polyester C | — | 14.5 |
| Dimethylethanolamine | 0.15 | 0.15 |
| Disparlon ® A670-20M | 5.0 | 5.0 |
| Deionized water | 15.0 | 15.0 |
| Fraction of polyamide (wt % solids) | 3% | 3% |
| Fraction of organic solvents (wt %) | 19.9% | 11.5% |

2.5 Preparation of Noninventive Comparative Dispersions of Thickeners V19 and V20:

The components listed in table 1.6 below are stirred together in the stated order with stirring at a temperature of 15-25° C. in each case to give a mixture. This mixture is subsequently homogenized with stirring over a time of 10 minutes in each case at the temperature stated above. The homogenization is carried out as described above in section 2.1.

TABLE 1.6

Preparation of noninventive comparative dispersions of thickeners V19 and V20

| Components | X1 | V19 | V20 |
|---|---|---|---|
| Aqueous dispersion of a polyester (I) | 22.50 | 22.50 | 22.50 |
| Dimethylethanolamine | 0.45 | 0.45 | 0.45 |
| 2,4,7,9-Tetramethyl-5-decynediol in butyl glycol (52 wt %) | 3.00 | 3.00 | 3.00 |
| Lipotin ® A | 3.00 | 3.00 | 3.00 |
| Deionized water | 56.05 | 56.05 | 54.35 |
| Disparlon ® A670-20M | 15.00 | — | — |
| Disparlon AQ600 | — | 15.00 | — |
| Disparlon AQ630 | — | — | 16.70 |
| Fraction of polyamide (wt % solids) | 3% | 3% | 3% |
| Fraction of organic solvents (wt %) | 17.9% | 7.0% | 7.6% |

Since V19 and V20 represent comparative dispersions relative to X1, X1 is individualized again in table 1.6 for greater ease of reference.

3 Preparation of Inventive Coating Compositions and Comparative Coating Compositions 3.1 General Operating Procedure for Producing Inventive Coating Compositions and Comparative Coating Compositions:

The components listed under "aqueous phase" in each of the tables below are stirred together in the order stated to form an aqueous mixture M1. In the next step an organic mixture M2 is prepared from the components listed under "organic phase" in the tables below. The organic M2 mixture is added to the aqueous mixture M1. The combined mixture is then stirred for 10 minutes and adjusted, using deionized water and dimethylethanolamine, to a pH of 8 and to a spray viscosity of 85±5 mPa·s under a shearing load of 1000 s$^{-1}$ as measured with a rotary viscometer (Rheolab QC instrument with C-LTD80/QC conditioning system from Anton Paar) at 23° C.

Where one of the tables below additionally includes the further heading "Mixing varnish", the components listed under that heading are each stirred together in the stated order first of all in order to prepare this mixing varnish, which is mixed at a temperature of 15 to 25° C. over a time of 10 minutes, and this mixing varnish is then added to the organic mixture M2. When the resulting mixture of mixing varnish and organic mixture M2 has been stirred over a time of 10 minutes at a temperature of 15 to 25° C., the resulting mixture is then added to the aqueous mixture M1, and the further procedure is as described above.

The respective quantity figures in each of the tables below represent wt % in each case, based on the total weight of the respective composition.

3.2 Coating Compositions V-I (Noninventive) and B-X6 and B-X7 (Inventive)

TABLE 2.1

Preparation of B-X6 and B-X7 and also of V-I

|  | B-X6 | B-X7 | V-I |
|---|---|---|---|
| Aqueous phase |  |  |  |
| Deionized water | 17.40 | 17.40 | 30.35 |
| n-Butoxypropanol | 1.90 | 1.90 | 1.90 |
| 2-Ethylhexanol | 1.70 | 1.70 | 1.70 |
| Dispersion of thickener X6 | 23.10 | — | — |
| Dispersion of thickener X7 | — | 23.10 | — |
| Disparlon ® A670-20M | — | — | 3.47 |
| Aqueous dispersion of at least one polymeric resin (II) | 24.25 | 24.25 | 24.25 |
| Aqueous dispersion of a polyester (I) | — | — | 5.20 |
| 1-Propoxy-2-propanol | 2.55 | 2.55 | 2.55 |
| Butyl glycol | 0.70 | 0.70 | 0.70 |
| Dimethylethanolamine in water (10 wt %) | 0.70 | 0.70 | 0.80 |
| Rheovis ® AS 1130 | 0.90 | 0.90 | 0.90 |
| Resimene ® HM 2608 | 4.40 | 4.40 | 4.40 |
| Pluriol P900 | 1.15 | 1.15 | 1.15 |
| Aqueous dispersion of at least one polymeric resin (II) | 3.45 | 3.45 | 3.45 |
| Organic phase |  |  |  |
| Alu Stapa Hydrolux ® VP56450 | 5.8 | 5.8 | 5.8 |
| Butyl glycol | 6.2 | 6.2 | 6.2 |
| Aqueous dispersion of at least one polymeric resin (II) | 5.8 | 5.8 | 5.8 |

3.3 Coating Compositions V-II and V-III (Noninventive) and B-X1 (Inventive)

TABLE 2.2

Preparation of V-II and V-III and also of B-X1

|  | V-II | B-X1 | V-III |
|---|---|---|---|
| Aqueous phase |  |  |  |
| Aqueous solution of an Na—Mg phyllosilicate (3 wt % in deionized water) | 26.70 | — | — |
| Deionized water | 7.75 | 16.48 | 29.34 |
| Butyl glycol | 5.78 | 5.78 | — |
| Dispersion of thickener X1 | — | 22.96 | — |
| Disparlon ® A670-20M | — | — | 3.44 |
| Aqueous dispersion of at least one polymeric resin (II) | 32.26 | 32.26 | — |
| Aqueous dispersion of a polyester (I) | 5.17 | — | 5.17 |
| Dimethylethanolamine in water (10 wt %) | 1.32 | 0.80 | 0.91 |
| Rheovis ® AS 1130 | 0.86 | 0.75 | — |
| 2,4,7,9-Tetramethyl-5-decynediol in butyl glycol (52 wt %) | 0.70 | — | 0.69 |
| Resimen ® HM 2608 | 4.36 | 4.36 | — |
| Pluriol ® P900 | 0.34 | 1.15 | — |
| Organic phase |  |  |  |
| Butyl glycol | 6.89 | 6.89 | 6.89 |
| Alu Stapa Hydrolux ® VP56450 | 5.74 | 5.74 | 5.74 |
| Mixing varnish: |  |  |  |
| Aqueous dispersion of at least one polymeric resin (II) | 1.89 | 1.89 | 1.89 |
| Deionized water | 1.17 | 1.17 | 1.17 |
| 2,4,7,9-Tetramethyl-5-decynediol in butyl glycol (52 wt %) | 0.24 | 0.24 | 0.24 |
| Dispex ® Ultra FA 4437 | 0.10 | 0.10 | 0.10 |
| Dimethylethanolamine in water (10 wt %) | 0.01 | 0.01 | 0.01 |
| Butyl glycol | 0.60 | 0.60 | 0.60 |

4 Tests and Investigations 4.1 Tests and Investigations into the Inventive Dispersions and Comparative Dispersions 4.1.1 The noninventive comparative dispersions of thickeners V1 to V14, each with an organic solvent content of >32 wt %, based on the total weight of the respective dispersion, are investigated and assessed by the methods described above for the incidence of bits, the homogeneity, and their storage stability.

The results are summarized in Table 3.1.

TABLE 3.1

|  | V1 to V14 |
|---|---|
| Homogeneity | 2 |
| Storage stability | 3 |
| Bittiness | 1 |

From table 3.1 it can be seen that V1 to V14 each exhibit adequate homogeneity with no observed incidence of bits, but that these dispersions do exhibit an inadequate storage stability, given that separation, in the form of phase separation, occurs after a period of only about 2 weeks on storage at 18-23° C. as described within the method of determination.

4.1.2 The noninventive comparative dispersions of thickeners V15 to V17, each with an organic solvent content of >47 wt %, based on the total weight of the respective dispersion, are investigated and assessed by the methods described above for the incidence of bits, the homogeneity, and their storage stability.

The results are summarized in Table 3.2.

TABLE 3.2

|  | V15 | V16 | V17 |
|---|---|---|---|
| Homogeneity | 1 | 1 | 1 |
| Stability | 3 | 3 | 5 |
| Bittiness | 1 | 1 | 1 |

From table 3.2 it can be seen that V15 to V17 each exhibit adequate homogeneity with no observed incidence of bits, but that these dispersions do exhibit an inadequate storage stability, given that separation, in the form of phase separation, occurs after a period of only several days on storage at 18-23° C. (in the case of V15 and V16) or after several hours on storage at 18-23° C. (in the case of V17) as described within the method of determination.

4.1.3 The inventive dispersions of thickeners X1 to X7, each with an organic solvent content of <20 wt %, based on the total weight of the respective dispersion, are investigated and assessed by the methods described above for the incidence of bits, the homogeneity, the water-miscibility, and their storage stability. For determination of the water-miscibility, X1 to X7 are each prepared by mixing the components stated in Table 1.4 in the order indicated therein, although, in accordance with the description of the method for determining the water-miscibility, half of the respective amount of deionized water indicated in Table 1.4 is used only as the last component in the preparation of X1 to X7 (in the case of X1, therefore, of the total of 56.05 parts by weight of deionized water, for example, 28.025 parts by weight are used only as a final component).

The results are summarized in Table 3.3.

TABLE 3.3

|  | X1 | X2 | X3 | X4 | X5 | X6 | X7 |
|---|---|---|---|---|---|---|---|
| Homogeneity | 1 | 1 | 1 | 1 | 1 | 1 | 1 |
| Water-miscibility: | 1 | 1 | 1 | 1 | 1 | 1 | 1 |
| Bittiness after preparation | 1 | 1 | 1.5 | 1.5 | 1.5 | 1 | 1 |
| after 14 days at 40° C. | 1 | 1 | 1.5 | 2 | 2 | 1 | 1 |
| after 28 days at 40° C. | 1 | 1 | 1.5 | 2 | 2 | 1 | 1 |
| after 42 days at 40° C. | 1 | 1 | 1.5 | 2 | 2 | 1 | 1 |
| Storage stability after 28 days at 40° C. | 1 | 1 | 1 | 1 | 1 | 1 | 1 |
| after 365 days at 40° C. | 1 | n.d. | 1 | n.d | n.d. | n.d. | n.d. | n.d. = not determined

From table 3.3 it can be seen that X1 to X7 each have good homogeneity and water-miscibility with no, or only slight, observed incidence of bits. Moreover, all of dispersions X1 to X7 each display good storage stability on storage at 40° C. over a period of 28 days as described within the method of determination: no separation, or phase separation, was observed. Dispersions X1 and X3, moreover, were stored over a period of 365 days at 40° C. as described within the method of determination: even after this comparatively long time, there were no observations of separation or of phase separation.

4.1.4 The inventive dispersion of thickener X8 and the comparative dispersion V18 are investigated and assessed according to the methods described above and in relation to the incidence of bits, the homogeneity, and the water-miscibility. For the determination of the water-miscibility, V18 and X8 are each prepared by mixing the components stated in Table 1.5, in the order indicated therein, and, in accordance with the description of the method for determining the water-miscibility, the amount of deionized water indicated in Table 1.5 is used only as a final component in the preparation of V18 and X8, respectively.

The results are summarized in table 3.4.

TABLE 3.4

|  | V18 | X8 |
|---|---|---|
| Homogeneity | 5 | 1 |
| Water-miscibility | 5 | 1 |
| Bittiness | 5 | 1 |

From table 3.4 it can be seen that with V18, in contrast to X8, it is possible to achieve neither good homogeneity nor good water-miscibility. Moreover, a large number of bits were observed in the case of V18.

V18 comprises as its polyester component a polyester which has not been obtained by reaction of at least one polymerized aliphatic $C_{12}$-$C_{24}$ monocarboxylic acid with at least one diol and/or polyol: these results show that it is essential to the invention that the polyester employed in accordance with the invention is obtainable by such a reaction with participation of a polymerized aliphatic $C_{12}$-$C_{24}$ monocarboxylic acid.

4.1.5 The inventive dispersion of thickener X1 and the comparative dispersions V19 and V20 are investigated and assessed according to the methods described above in relation to the incidence of bits and the homogeneity.

The results are summarized in Table 3.5.

TABLE 3.5

|  | X1 | V19 | V20 |
|---|---|---|---|
| Homogeneity | 1 | 1 | 1 |
| Bittiness after preparation | 1 | 3-4 | 3-4 |
| after 14 days at 40° C. | 1 | 3-4 | 3-4 |

From Tab. 3.5 it can be seen that with V19 and V20, although good homogeneity can be achieved as with X1 as well, V19 and V20 nevertheless differ from X1 in that the incidence of a large number of bits after preparation and also after storage is observed. V19 and V20 comprise, as polyamides, polyamides of high acid number that are customarily used in aqueous compositions, specifically the commercially available products Disparlon® AQ600 (V19) and AQ630 (V20). This disadvantage is not observed in the case of X1.

4.2 Tests and Investigations into the Inventive Coating Compositions and Comparative Coating Compositions 4.2.1 Investigations into the Incidence of Pinholes and Bits These investigations take place in accordance with the methods described above.

The results are summarized in tables 4.1 and 4.2.

TABLE 4.1

Results of the investigations into the incidence of pinholes

| Film thickness range Clearcoat wedge | B-X6 | B-X7 | V-I |
|---|---|---|---|
| 20-30 μm | 0 | 0 | n.m. |
| 30-40 μm | 0 | 0 | n.m. |
| 40-50 μm | 0 | 0 | n.m. |
| Total | 0 | 0 | n.m. | n.m.=not measurable

TABLE 4.2

Results of the investigations into incidence of bits

|  | B-X6 | B-X7 | V-I |
|---|---|---|---|
| Bits | 1 | 1 | 5 |

As can be seen from table 4.1, the presence of the inventive dispersions X6 and X7 as a component of the aqueous basecoat materials B-X6 and B-X7 results in excellent pinhole robustness: no pinholes were observed. As can be seen from table 4.2, moreover, no bittiness at all was observed in the case of B-X6 and B-X7. In contrast, a large number of bits were observed in the case of comparative basecoat material V-I: the aqueous comparative basecoat material V-I contains the individual components used to prepare the dispersions of the invention, namely a polyester (aqueous dispersion of polyester (I)) and a polyamide (Disparlon® A670-20M), which, however, are not processed beforehand to form a dispersion according to the invention, but were instead incorporated directly, as separate components, into the comparative basecoat material V-I. In the case of V-I, moreover, on storage at 18-23° C., separation is observed after just a few 10 hours. For this reason, it is not possible to evaluate the pinhole test in the case of V-I.

4.2.2 Investigations into the Incidence of Bits and the Storage Stability

These investigations take place in accordance with the methods described above.

The results are summarized in tables 4.3 and 4.4.

TABLE 4.3

Results of the investigations into incidence of bits

|  | V-II | B-X1 | V-III |
|---|---|---|---|
| Bits | 1 | 1 | 5 |

TABLE 4.4

Results of the investigations into storage stability

|  |  | V-II | B-X1 | V-III |
|---|---|---|---|---|
| Low-shear viscosity (1 s$^{-1}$) in mPa · s | directly after preparation | 3013 | 3053 | n.m. |
|  | after 2 weeks' storage at 40° C. | 3819 | 3177 | n.m. |
|  | Change [%] | 27 | 4 |  |
| High-shear viscosity (1000 s$^{-1}$) in mPa · s | directly after preparation | 78 | 79 | n.m. |
|  | after 2 weeks' storage at 40° C. | 87 | 85 | n.m. |
|  | Change [%] | 11 | 6 |  | n.m. = not measurable

As can be seen from table 4.3, there was no observable bittiness in the case of B-X1 and V-II (containing an Na—Mg phyllosilicate as thickener). In contrast, a large number of bits were observed in the case of comparative basecoat material V-III: the aqueous comparative basecoat material V-III contains the individual components used to prepare the dispersions of the invention, namely a polyester (aqueous dispersion of polyester (I)) and a polyamide (Disparlon® A670-20M), which, however, are not processed beforehand to form a dispersion according to the invention, but were instead incorporated directly, as separate components, into the comparative basecoat material V-III. In the case of V-III, on storage at 40° C., phase separation, or separation, is observed after just a few hours, namely that the inventively employed polyamide cannot be incorporated as it is into an aqueous basecoat material, but instead only in the form of an inventive aqueous dispersion. For this reason, and on account of a large number of bits which occurred in the case of comparative basecoat material V-III, determination of the low-shear and high-shear viscosities is not possible in the case of V-III. The waterborne basecoat materials V-II and B-X1, in contrast, are stable on storage at 40° C. and exhibit an acceptable shift in the high-shear and low-shear viscosities after 2 weeks of storage at 40° C., with the inventive waterborne basecoat material B-X1 exhibiting significant advantages over V-II (small changes) (cf. table 4.4).

4.2.3 Investigations into the Cloudiness

This investigation takes place in accordance with the method described above. The inventive coating composition B-X1 and also the comparative coating composition V-II as waterborne basecoat material are applied to a steel panel coated as described within the method of determination. Subsequently, as described within the method, a clearcoat material is applied to the resulting respective basecoat films.

The results are summarized in Table 4.5.

TABLE 4.5

Results of the investigations into cloudiness

|  | V-II | B-X1 |
|---|---|---|
| Clouds viewed straight on (80°) | 4 | 2 |
| Clouds viewed at an angle (40°) | 4 | 3 |

The results show that the inventive coating composition B-X1 in comparison to V2 has substantially lower cloudiness.

The invention claimed is:

1. An aqueous dispersion (P) comprising at least one polymeric resin (P1) and at least one polymeric resin (P2) different therefrom, wherein
   the polymeric resin (P1) is a polyamide and
   the polymeric resin (P2) is a polyester,
   the aqueous dispersion (P) is obtained by dispersing the polymeric resin (P1) in water or an aqueous medium in the presence of the polymeric resin (P2),
   the polyamide as polymeric resin (P1) has an acid number <10 mg of KOH per g of polyamide,
   the polyester as polymeric resin (P2) is obtained by reaction of at least one polymerized aliphatic $C_{12}$-$C_{24}$ monocarboxylic acid with at least one diol and/or polyol, and
   the aqueous dispersion (P) contains at most 25 wt %, based on the total weight of the dispersion (P), of one or more organic solvents.

2. The aqueous dispersion (P) as claimed in claim 1, which contains at most 20 wt %, based on the total weight of the dispersion (P), of one or more organic solvents.

3. The aqueous dispersion (P) as claimed in claim 1, wherein the polyamide as polymeric resin (P1) has an acid number in a range from 0.01 to 8.0 mg of KOH per g of polyamide.

4. The aqueous dispersion (P) as claimed in claim 1, wherein a relative weight ratio of polymeric resins (P2) and (P1) to one another, based in each case on their solids content, in the dispersion (P) is in a range from 10:1 to 1.5:1.

5. The aqueous dispersion (P) as claimed in claim 1, wherein the polyamide as polymeric resin (P1) is present in the dispersion (P) in an amount in a range from 0.5 to 15 wt %, based on the total weight of the dispersion (P).

6. The aqueous dispersion (P) as claimed in claim 1, wherein the polyester as polymeric resin (P2) is present in the dispersion (P) in an amount in a range from 5 to 20 wt %, based on the total weight of the dispersion (P).

7. The aqueous dispersion (P) as claimed in claim 1, wherein the polyester as polymeric resin (P2) has an acid number in a range from 20 to 50 mg of KOH per g of polyester and/or a hydroxyl number in a range from 20 to 300 mg of KOH per g of polyester.

8. The aqueous dispersion (P) as claimed in claim 1, wherein the polyester as polymeric resin (P2) is obtained by reaction of at least one dimerized and/or trimerized aliphatic $C_{12}$-$C_{24}$-monocarboxylic acid with at least one aliphatic $C_2$-$C_{20}$ polyol and/or $C_2$-$C_{20}$ diol.

9. The aqueous dispersion (P) as claimed in claim 1, wherein the polyester as polymeric resin (P2) is prepared additionally with at least one dicarboxylic acid and/or at least one tricarboxylic acid selected from the group consisting of aliphatic $C_3$-$C_{12}$ dicarboxylic acids, cycloaliphatic $C_5$-$C_{12}$ dicarboxylic acids, aromatic $C_8$-$C_{12}$-dicarboxylic acids, aliphatic $C_5$-$C_{12}$ tricarboxylic acids, cycloaliphatic $C_6$-$C_{12}$ tricarboxylic acids and aromatic $C_9$-$C_{12}$ tricarboxylic acids, and optionally additionally with at least one aliphatic $C_{12}$-$C_{24}$ monocarboxylic acid.

10. The aqueous dispersion (P) as claimed in claim 1, wherein the aqueous dispersion does not form two or more macroscopic phases after storage at 40° C. for 28 days.

11. An aqueous coating composition comprising
the aqueous dispersion (P) as claimed in claim 1,
at least one binder (A) comprising at least one polymeric resin (A1), which is different from the polymeric resins (P1) and (P2), and optionally at least one crosslinking agent (A2), and
at least one pigment (B),
wherein the composition is configured for at least partly coating an optionally coated substrate with a basecoat film.

12. The coating composition as claimed in claim 11, which comprises the polyamide as polymeric resin (P1) within the dispersion (P) in an amount in a range from 0.05 to 5 wt %, based on the total weight of the coating composition.

13. The coating composition as claimed in claim 11, wherein the binder (A) comprises at least one polyurethane and/or at least one poly(meth)acrylate and/or at least one polyester as at least one polymeric resin (A1).

14. The coating composition as claimed in claim 11, which comprises the polymeric resin (A1) in an amount in a range from 5 to 40 wt %, based on the total weight of the coating composition, and the pigment (B) in an amount in a range from 0.1 to 25 wt %, based on the total weight of the coating composition.

15. A substrate coated at least partly with the aqueous coating composition as claimed in claim 11.

16. The substrate of claim 15, wherein the substrate coated at least partly with the aqueous coating composition does not comprise bits, pinholes, and/or pops.

17. A method of making an aqueous coating composition, the method comprising:
incorporating the dispersion (P) as claimed in claim 1 as a rheological assistant in an aqueous coating composition.

* * * * *

UNITED STATES PATENT AND TRADEMARK OFFICE
CERTIFICATE OF CORRECTION

PATENT NO. : 10,160,872 B2
APPLICATION NO. : 15/505477
DATED : December 25, 2018
INVENTOR(S) : Cathrin Corten et al.

It is certified that error appears in the above-identified patent and that said Letters Patent is hereby corrected as shown below:

In the Specification

Column 10, Line 42, delete "C12-$C_{24}$" and insert --$C_{12}$-$C_{24}$--.

Column 12, Line 51, delete "$C_9$-$C_{12}$tricarboxylic" and insert --$C_9$-$C_{12}$ tricarboxylic--.

Column 13, Line 10, delete "C1-$C_{20}$" and insert --$C_1$-$C_{20}$--.

Column 18, Line 34, delete "$C_{1-6}$alkyl" and insert --$C_{1-6}$ alkyl--.

Column 20, Line 41, after --polyol or a polyester polyol.-- insert:
--Utilized as blocked polyisocyanates may be any desired isocyanates wherein the the isocyanatc groups have been reacted with a compound, making the resultant blocked polyisocyanate particularly stable with respect to hydroxyl groups and amino groups such as primary and/or secondary amino groups at room temperature, in other words at a temperature of 18 to 23° C., but reactin at elevated temperatures, as for example at 80° C., more preferably ≥110° C., very preferably 130° C., and especially preferably ≥ 140° C., or at 90° C. to 300° C., or at 100 to 250° C., more preferably still at 125 to 250° C., and very preferably at 150 to 250° C. For the blocking of the isocyanates it is possible with preference to use any desired suitable aliphatic. cycloaliphatic, or aromatic alkyl monoalcohols. Examples thereof are aliphatic, alcohols, such as methyl, ethyl, chloroethyl, propyl, butyl, amyl, hexyl, heptyl, octyl, nonyl, 3,35-trimethylhexyl, decyl, and lauryl alcohol; cycloaliphatic alcohols, such as cyclopentanol and cyclohexanol; and aromatic alkyl alcohols, such as phenylcarbinol and methylphenyl- Signed and Sealed this
Thirtieth Day of July, 2019

Andrei Iancu
*Director of the United States Patent and Trademark Office* carbinol. Other suitable blocking agents are hydroxylamines, such as ethanolamine, oximes, such as methyl ethyl ketone oxime, acetone oxime, and cyclohexanone oxime, and amines, such as dibutylamine and diisopropylamine."--.

Column 20, Lines 42-64, delete:
"Utilized as blocked polyisocyanates may be any desired isocyanates wherein the the isocyanatc groups have been reacted with a compound, making the resultant blocked polyisocyanate particularly stable with respect to hydroxyl groups and amino groups such as primary and/or secondary amino groups at room temperature, in other words at a temperature of 18 to 23° C., but reactin at elevated temperatures, as for example at 80° C., more preferably ≥110° C., very preferably 130° C., and especially preferably ≥ 140° C., or at 90° C. to 300° C., or at 100 to 250° C., more preferably still at 125 to 250° C., and very preferably at 150 to 250° C. For the blocking of the isocyanates it is possible with preference to use any desired suitable aliphatic. cycloaliphatic, or aromatic alkyl monoalcohols. Examples thereof are aliphatic, alcohols, such as methyl, ethyl. chloroethyl, propyl, butyl, amyl, hexyl, heptyl, octyl, nonyl, 3,35-trimethylhexyl, decyl, and lauryl alcohol; cycloaliphatic alcohols, such as cyclopentanol and cyclohexanol; and aromatic alkyl alcohols, such as phenylcarbinol and methylphenylcarbinol. Other suitable blocking agents are hydroxylamines, such as ethanolamine, oximes, such as methyl ethyl ketone oxime, acetone oxime, and cyclohexanone oxime, and amines, such as dibutylamine and diisopropylamine.".

Column 41, Line 12, after "a few" delete "10".